(12) United States Patent
Karthikeyan et al.

(10) Patent No.: US 11,049,114 B2
(45) Date of Patent: Jun. 29, 2021

(54) DEVICE, MEDIUM, AND METHOD FOR TAILORED INTERFACE GENERATION BASED ON INTERNET OF THINGS DATA, VENDOR DATA, AND/OR USER PREFERENCES DATA

(71) Applicant: Accenture Global Solutions Limited, Dublin (IE)

(72) Inventors: Sailatha Karthikeyan, Bangalore (IN); Balaji Venkataraman, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 274 days.

(21) Appl. No.: 15/994,385

(22) Filed: May 31, 2018

(65) Prior Publication Data

US 2019/0370815 A1     Dec. 5, 2019

(51) Int. Cl.
  *G06Q 30/00*  (2012.01)
  *G06Q 10/00*  (2012.01)
  *G06N 20/00*  (2019.01)
  *G06F 16/9038* (2019.01)

(52) U.S. Cl.
  CPC ....... *G06Q 30/016* (2013.01); *G06F 16/9038* (2019.01); *G06N 20/00* (2019.01); *G06Q 10/20* (2013.01)

(58) Field of Classification Search
  None
  See application file for complete search history.

(56) References Cited

U.S. PATENT DOCUMENTS

| 2004/0148188 A1* | 7/2004 | Uegaki ................. G06Q 10/10 705/305 |
| 2006/0025908 A1* | 2/2006 | Rachlin ............. G05B 23/0251 701/31.4 |
| 2010/0042287 A1* | 2/2010 | Zhang .................. G06Q 10/06 701/31.4 |

(Continued)

OTHER PUBLICATIONS

Su, Chuan-Jun, Real-Time Big Data Analytics for Hard Disk Drive Predictive Maintenance, 2018, Computers & Electrical Engineering, vol. 71, pp. 93-101 (Year: 2018).*

*Primary Examiner* — Jeffrey A. Smith
*Assistant Examiner* — Timothy J Kang
(74) *Attorney, Agent, or Firm* — Harrity & Harrity, LLP

(57) ABSTRACT

A device may receive client equipment information for a set of client equipment associated with an organization. The device may receive information describing a set of equipment management services being offered by one or more vendor organizations. The device may identify a subset of the set of equipment management services to offer an individual associated with the organization. The device may provide, for display via an interface of a program, information describing the subset of the set of equipment management services. The device may receive, from a client device that is accessing the interface, information identifying a selection of a particular equipment management service, of the subset of the set of equipment management services, for particular client equipment of the set of client equipment. The device may perform one or more actions associated with assisting in performance or delivery of the particular equipment management service that has been selected.

20 Claims, 13 Drawing Sheets

(56) References Cited

U.S. PATENT DOCUMENTS

| | | | |
|---|---|---|---|
| 2014/0278681 A1* | 9/2014 | Cox | G06Q 30/0623 |
| | | | 705/7.19 |
| 2015/0106202 A1* | 4/2015 | Bastaldo-Tsampalis | ..................... |
| | | | G06Q 30/0267 |
| | | | 705/14.55 |
| 2016/0225198 A1* | 8/2016 | Punjabi | G07C 5/008 |
| 2017/0345090 A1* | 11/2017 | Griddle | G06F 16/335 |
| 2019/0122178 A1* | 4/2019 | Kempf | G06Q 10/08355 |
| 2019/0188797 A1* | 6/2019 | Przechocki | G06N 20/00 |

* cited by examiner

Techniques to Identify or Determine Information to be Provided to Vendor Organizations

- Reference client equipment information
- Compare client equipment information to threshold values
- Provide client equipment information as input to machine learning models

125

Identify client equipment that has malfunctioned, predict client equipment that is to malfunction, and/or determine a cause of the malfunction

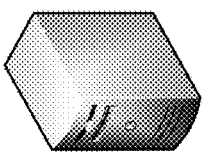

Equipment Management Platform

FIG. 1C

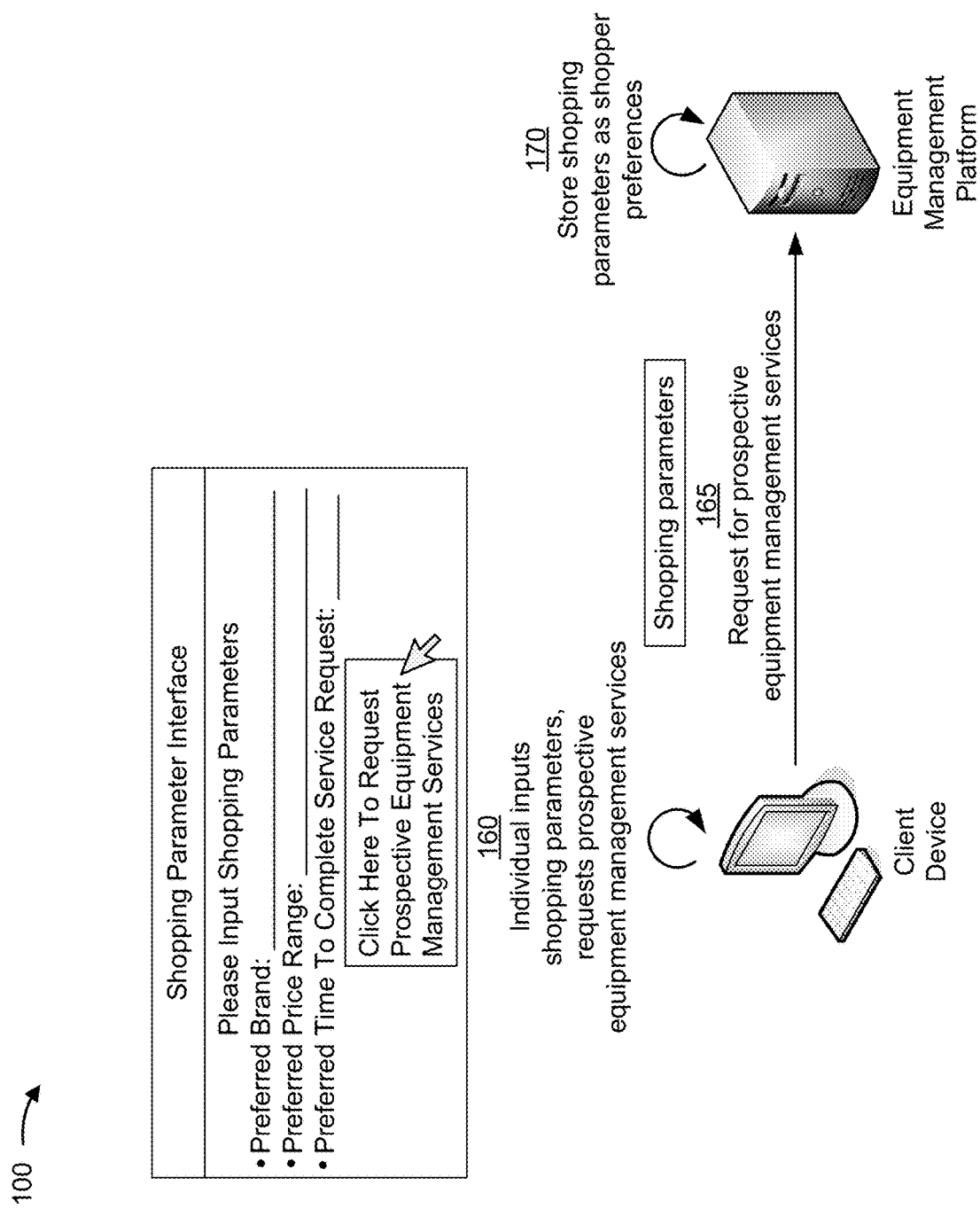

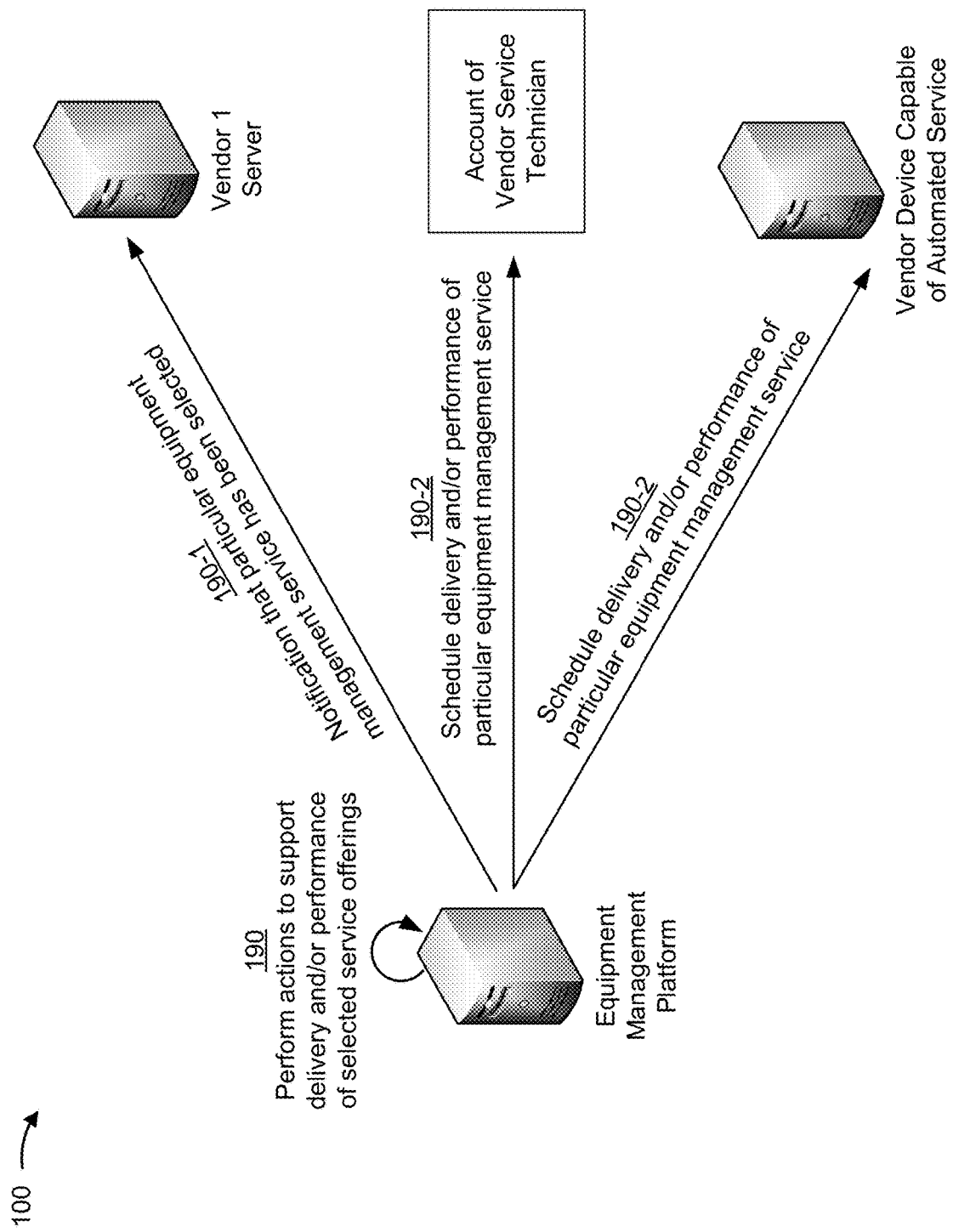

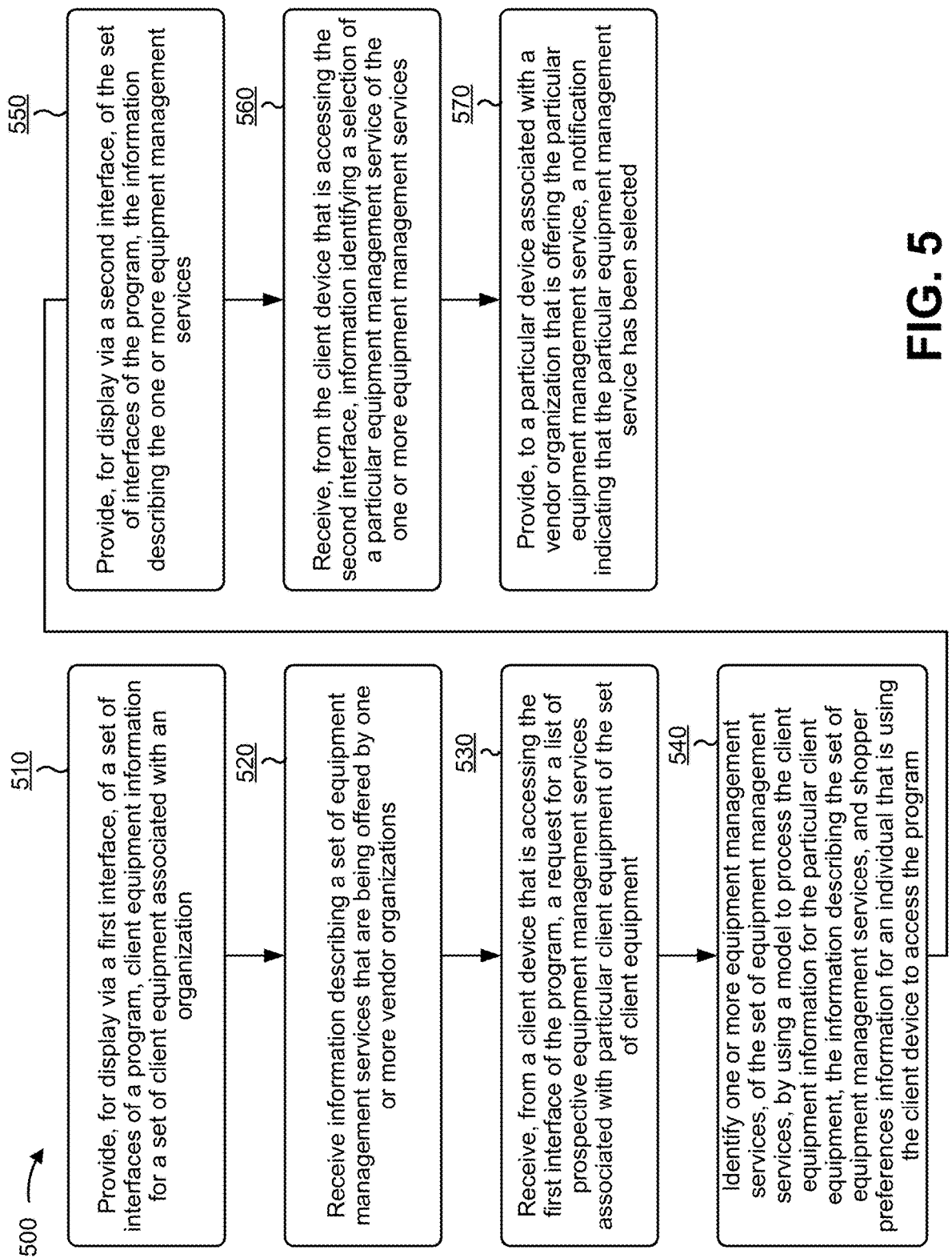

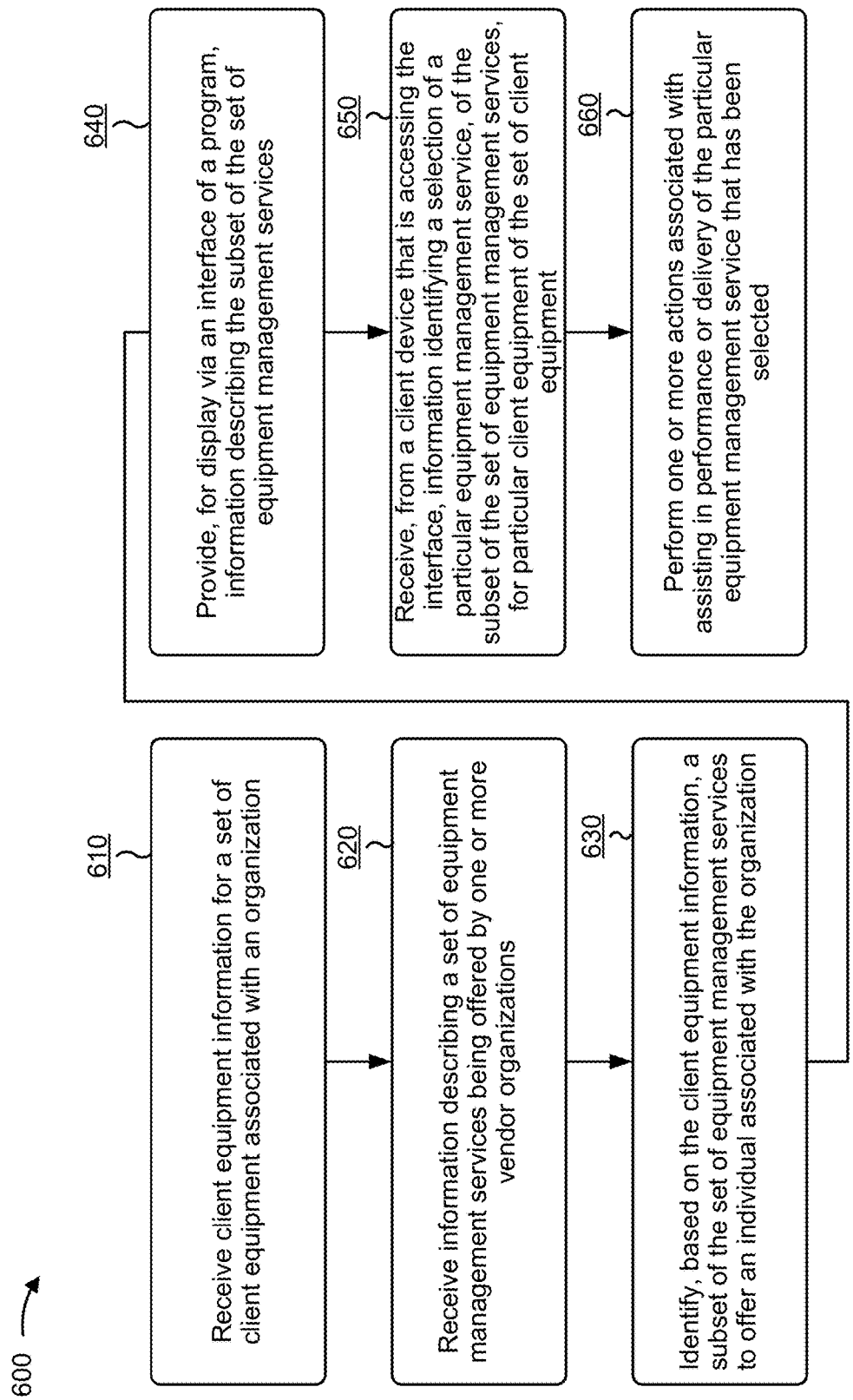

DEVICE, MEDIUM, AND METHOD FOR TAILORED INTERFACE GENERATION BASED ON INTERNET OF THINGS DATA, VENDOR DATA, AND/OR USER PREFERENCES DATA

BACKGROUND

The Internet of things (IoT) may refer to a network of devices that interact without human intervention. Equipment management may refer to any systematic process for developing, operating, maintaining, upgrading, and/or disposing of equipment.

SUMMARY

According to some possible implementations, a device may include one or more memories and one or more processors that are communicatively coupled to the one or more memories. The one or more processors may receive client equipment information for a set of client equipment associated with an organization. The client equipment information may include information identifying an equipment state. The one or more processors may receive information describing a set of equipment management services that are being offered by one or more vendor organizations. The set of equipment management services may be offered based on the client equipment information. The one or more processors may receive, from a client device that is accessing an interface of a program, a request for a list of prospective equipment management services associated with particular client equipment of the set of client equipment. The program may be used to allow the one or more vendor organizations to offer the set of equipment management services to the organization. The one or more processors may identify one or more equipment management services, of the set of equipment management services, for the list of prospective equipment management services, by using a model to process: the client equipment information for the particular client equipment, the information describing the set of equipment management services, and shopper preferences information for an individual that is using the client device to access the program. The one or more processors may provide information describing the one or more equipment management services for display on another interface of the program. The one or more processors may receive, from the client device that is accessing the other interface, information identifying a selection of a particular equipment management service of the one or more equipment management services. The one or more processors may provide, to a particular device associated with a vendor organization that is offering the particular equipment management service, a notification indicating that the particular equipment management service has been selected.

According to some possible implementations, a non-transitory computer-readable medium may store instructions that, when executed by one or more processors, cause the one or more processors to provide, for display via a first interface, of a set of interfaces of a program, client equipment information for a set of client equipment associated with an organization. The client equipment information for each client equipment, of the set of client equipment, may include information identifying an equipment state. The first interface may be provided based on receiving the client equipment information. The one or more instructions may cause the one or more processors to receive information describing a set of equipment management services that are being offered by one or more vendor organizations. The set of equipment management services being offered may be based on the client equipment information. The one or more instructions may cause the one or more processors to receive, from a client device that is accessing the first interface of the program, a request for a list of prospective equipment management services associated with particular client equipment of the set of client equipment. The one or more instructions may cause the one or more processors to identify one or more equipment management services, of the set of equipment management services, for the list of prospective equipment management services, by using a model to process: the client equipment information for the particular client equipment, the information describing the set of equipment management services, and shopper preferences information for an individual that is using the client device to access the program. The one or more instructions may cause the one or more processors to provide, for display via a second interface, of the set of interfaces of the program, the information describing the one or more equipment management services. The one or more instructions may cause the one or more processors to receive, from the client device that is accessing the second interface, information identifying a selection of a particular equipment management service of the one or more equipment management services. The one or more instructions may cause the one or more processors to provide, to a particular device associated with a vendor organization that is offering the particular equipment management service, a notification indicating that the particular equipment management service has been selected.

According to some possible implementations, a method may include receiving, by a device, client equipment information for a set of client equipment associated with an organization. The client equipment information for each client equipment, of the set of client equipment, may include information identifying an equipment state. The method may include receiving, by the device, information describing a set of equipment management services being offered by one or more vendor organizations. The set of equipment management services offered may be based on the client equipment information. The method may include identifying, by the device and based on the client equipment information, a subset of the set of equipment management services to offer an individual associated with the organization. The subset may be identified by using a model to process at least one of: the client equipment information, the information describing the set of equipment management services, or shopper preferences information for the individual. The method may include providing, by the device and for display via an interface of a program to display information describing the subset of the set of equipment management services. The method may include receiving, by the device and from a client device that is accessing the interface, information identifying a selection of a particular equipment management service, of the set of equipment management services, for particular client equipment of the set of client equipment. The method may include performing, by the device, one or more actions associated with assisting in performance or delivery of the particular equipment management service that has been selected.

BRIEF DESCRIPTION OF THE DRAWINGS

FIGS. 1A-1H are diagrams of an example implementation described herein.

FIGS. 4-6 are flow charts of an example process for dynamically updating a set of interfaces of a program that is used to display one or more equipment management services that are being offered to an organization based on a state of client equipment associated with the organization.

DETAILED DESCRIPTION

Figure 1A:
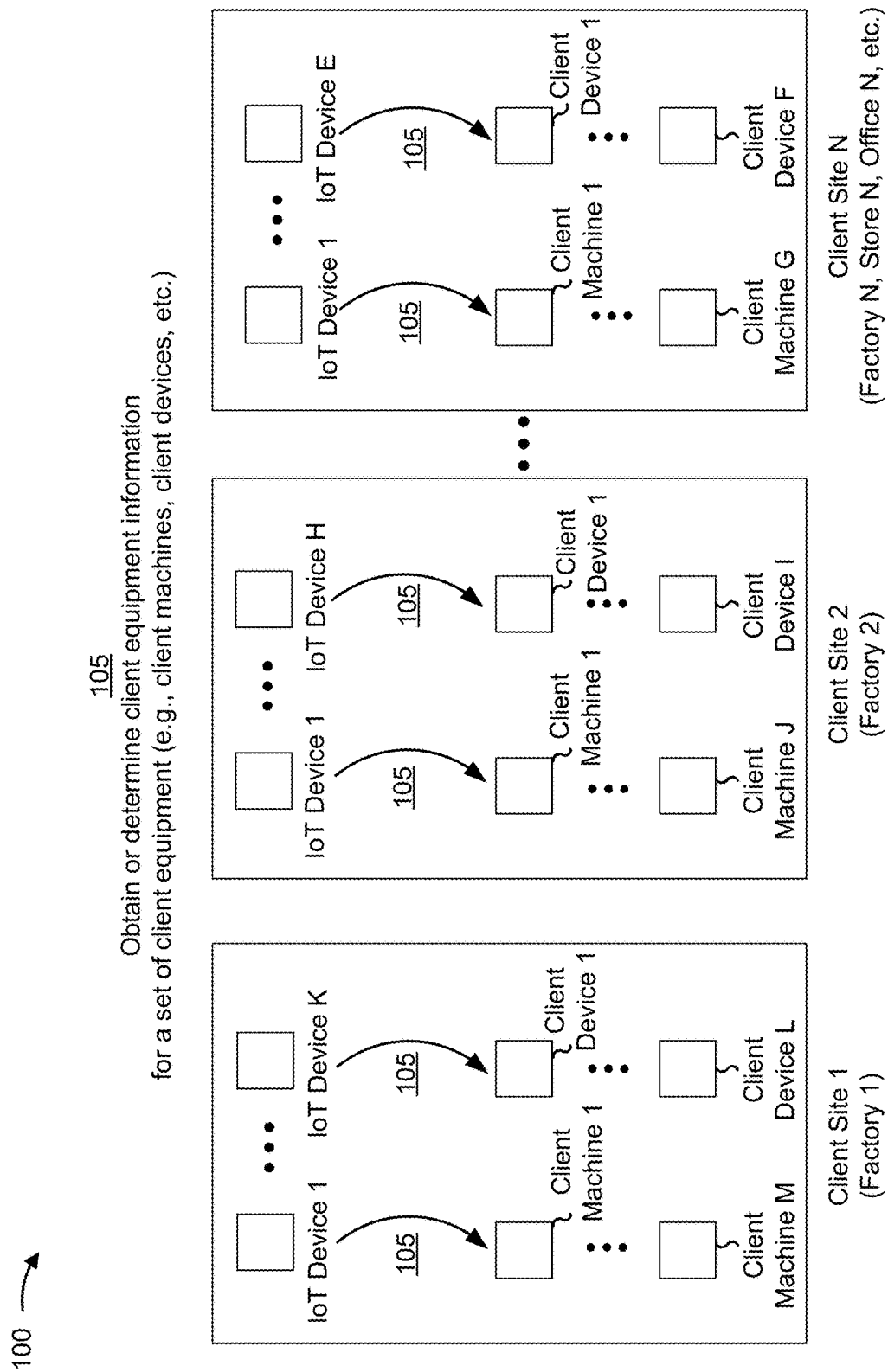

The following detailed description of example implementations refers to the accompanying drawings. The same reference numbers in different drawings may identify the same or similar elements.

The internet of things (IoT) may refer to a network of devices that interact without human intervention. For example, a set of IoT devices may be used to interact with each other and share information that is obtained by monitoring areas surrounding the set of IoT devices, by monitoring equipment near the IoT devices, and/or the like.

Equipment management may refer to processes for developing, operating, maintaining, upgrading, and/or disposing of equipment. For example, an organization may implement an equipment management process for managing a set of client equipment (e.g., one or more machines, one or more devices, etc.) that are used to support goods and/or services provided by the organization.

Over time, the set of client equipment may begin to degrade, and may need to be maintained, repaired, replaced, and/or the like. When particular client equipment malfunctions, the particular client equipment may be unable to complete tasks required by the organization, thereby reducing overall productivity of the organization. Additionally, one or more devices associated with the organization may expend processing resources and/or network resources to search for and select a vendor organization that offers equipment management services needed to fix or replace the particular client equipment. Furthermore, if the selected vendor organization does not offer a proper equipment management service, one or more devices associated with the organization may expend processing resources and/or network resources to help the vendor organization perform a repair or an installation of an improper equipment management service, may expend processing resources and/or network resources to re-search and select a new vendor organization, and/or the like.

Some implementations described herein include an equipment management platform to provide an organization with the ability to select an equipment management service that is dynamically offered by vendor organizations based on a current equipment state of client equipment of the organization. For example, the organization may deploy a set of IoT devices that are able to monitor the set of client equipment to obtain client equipment information. The client equipment information may provide a current equipment state of the set of client equipment.

Additionally, the equipment management platform may interact with one or more vendor devices to provide the vendor devices with the client equipment information. This may allow the one or more vendor devices to generate offers for a set of equipment management services that are made based on the client equipment information. The offers for the set of equipment management services may include a repair service, a replacement service, a service recommending to purchase additional client equipment (in addition to existing client equipment), a service recommending to remove client equipment (e.g., without replacement), and/or the like.

Additionally, an individual employed by the organization may use a client device to access the equipment management platform. For example, the individual may use the client device to view an interface that is provided by the equipment management platform and that displays the equipment state for each of the set of client equipment.

Additionally, the equipment management platform may use a model (e.g., a parameter-driven model, a machine learning model, etc.), to identify one or more equipment management services, from the set of equipment management services being offered by the vendor devices. Furthermore, the equipment management platform may provide, for display on another interface of the client device, information describing the one or more equipment management services. In this case, the individual may interact with the other interface to select a particular equipment management service from the one or more equipment management services that have been identified. Moreover, the equipment management platform may provide, to a vendor device offering the particular equipment management service, a notification indicating that the particular equipment management service has been selected.

In this way, the equipment management platform is able to provide the organization with offers for equipment management services that are based on the client equipment information of the set of client equipment and/or that are based on shopper preferences of employees of the organization. This allows the equipment management platform to conserve processing resources and/or network resources that might otherwise be used to provide the client device with offers of equipment management services that are not relevant to the particular client equipment that needs to be serviced, offers of equipment management services that do not comply with shopper preferences of the individual, and/or the like. Furthermore, in some cases, the equipment management platform may provide the organization with predictions as to when client equipment is likely to malfunction. This conserves processing resources and/or network resources of one or more devices of the organization that would otherwise be used to manage client equipment that malfunctions or fails.

FIGS. 1A-1H are diagrams of an example implementation 100 described herein. For example, example implementation 100 may include an equipment management platform, a set of client equipment, a set of internet of things (IoT) devices, an IoT platform, and a set of vendor devices. In this case, the equipment management platform may interact with one or more of the above-mentioned equipment or devices to support a program (e.g., a website, an application, such as a mobile application, etc.) that provides an organization with offers of equipment management services for a set of client equipment of the organization.

As shown in FIG. 1A, the set of IoT devices (shown as IoT Device 1 through IoT Device K, IoT Device 1 through IoT Device H, IoT Device 1 through IoT Device E, etc.) may be located at one or more client sites (shown as client site 1, client site 2, through client site N), and the organization may deploy the set of IoT devices at the one or more client sites for monitoring the set of client equipment. The set of IoT devices may include a set of sensors, a set of smart devices, a set of software elements that are capable of monitoring, measuring, and/or providing client equipment information for the set of client equipment, and/or the like.

The set of sensors may include a location sensor, an image sensor, a temperature sensor, a power sensor, a sensor capable of measuring electrical signals (e.g., a voltage sensor, a resistance sensor, and/or the like), a movement sensor (e.g., an accelerometer, a vibration sensor, speed sensor, and/or the like), and/or the like. The set of smart devices may include a device capable of communicating with other devices using a wireless access network (WAN) connection, such as a Bluetooth connection, a connection utilizing near-field communication (NFC), a Wi-Fi connection, and/or the like.

The set of software elements may include an application to measure a particular hardware component of client equipment, an application to determine a value associated with measuring quality of data transmission of the client equipment, an application capable of interacting with a radio-frequency identification (RFID) tag and/or a quick response (QR) code, and/or the like. For example, the set of software elements may include an application to measure link quality of links connecting hardware components, errors found in data transmission, signal integrity, temperature of a hardware component, and/or the like. Additionally, or alternatively, the set of software elements may include an application to obtain data stored within an RFID tag and/or a QR code, and/or the like.

The set of client equipment may include a set of client machines (e.g., machines on a factory floor), a set of client devices (e.g., computer equipment), and/or any other mechanism that may be used to help the organization create, manage, market, distribute, and/or maintain a product or service. For example, the set of client machines for an automotive manufacturer may include machines commonly found within factories that are used to build automotive parts. Continuing with the example, the set of client devices may include handheld devices, desktop computers, server computers, and/or any other device with a processor that is capable of assisting in the process of creating, managing, marketing, distributing, and/or maintaining automotive parts.

In some implementations, the set of client equipment may be able to function as an IoT device. Additionally, or alternatively, the set of client equipment may be monitored by the set of IoT devices, where the IoT devices are separate from the set of client equipment.

As shown by reference number 105, the set of IoT devices may obtain or determine client equipment information for the set of client equipment. For example, the set of IoT devices may obtain the client equipment information by using one or more sensors to detect the client equipment information, by requesting the client equipment information (e.g., via a communication interface), and/or the like. Additionally, the set of IoT devices may obtain or determine the client equipment information for the set of client equipment at configured time periods, based on receiving a request from a user, and/or the like.

The client equipment information may include static information identifying client equipment. The static information may include an equipment identifier, one or more component identifiers (e.g., identifying hardware components of client equipment), one or more element identifiers (e.g., identifying software elements associated with the client equipment), manufacturing information (e.g., identifying a manufacturing date, a manufacturer name, etc.), location information (e.g., identifying a geographic location of the client equipment, which may be said to be part of the dynamic information depending on whether the client equipment is stationary or mobile), and/or the like.

In some implementations, an IoT device may obtain static information for particular client equipment by using a communication interface to submit a request. For example, if a client device is able to transmit and/or receive data, an IoT device may provide a request for static information to the client device. This may cause the client device to provide the static information to the IoT device.

Additionally, or alternatively, the IoT device may obtain static information for particular client equipment by using one or more sensors to detect the static information. For example, the IoT device may use a sensor (e.g., an image sensor) to capture an equipment identifier for the client machine (e.g., such as a serial number displayed on a tag that is affixed to the client machine), to read a RFID tag and/or a QR code affixed to the client machine, and/or the like.

Additionally, or alternatively, the IoT device may search a data source to obtain the static information for particular client equipment. For example, the IoT may use a communication interface described above to search (e.g., query) the data source to obtain the static information for the client equipment. Additionally, or alternatively, the IoT device may be configured with or may be provided with the static information for the client equipment.

The client equipment information may include dynamic information that identifies an equipment state of the client equipment and/or that may be used to determine the equipment state of the client equipment. The equipment state may be an operational state, a functional state, a state serving as an indicator of a degree to which the client equipment is able to perform a task, a state serving as an indicator of a duration with which the client equipment will be able to continue performing the task, and/or the like. In some implementations, the equipment state may be based on one or more hardware component states of hardware components within client equipment and/or one or more software element states of software elements within the client equipment.

As an example, five equipment states might be available for client equipment. In this example, a first equipment state may indicate that client equipment is not functioning properly, and that a malfunction may influence other nearby client equipment. A second equipment state may indicate that the client equipment is not functioning properly. A third equipment state may indicate that client equipment is functioning properly, but may be predicted to malfunction (e.g., within a threshold time period). A fourth equipment state may indicate that client equipment is functioning properly, but that maintenance or an upgrade is required. A fifth equipment state may indicate that client equipment is functioning properly.

The dynamic client equipment information may include information indicating an equipment state of client equipment, a component state of a hardware component of the client equipment, an element state of a software element of the client equipment, and/or information that may be used to determine a particular state, such as structural information associated with the client equipment, temperature information for a hardware component of the client equipment, link quality information associated with links within the client equipment, signal integrity information, and/or the like. To provide a few examples, the structural information may include data identifying structural inconsistencies and/or degradation of the client equipment. The link quality information may include a bit error rate (BER) value, a forward error correction (FEC) value, a cyclic redundancy check (CRC) value, and/or the like. The signal integrity information may include a signal-to-noise (SNR) ratio value, and/or the like.

Additionally, or alternatively, the IoT device may obtain dynamic information for particular client equipment by using a communication interface to submit a request. For example, if a client device is able to transmit and/or receive data, the IoT device may provide the client device with a request for dynamic information. This may cause the client device to provide the dynamic information to the IoT device. The client device may generate the dynamic information using one or more of the techniques described below.

Additionally, or alternatively, the IoT device may obtain dynamic information for particular client equipment by using one or more sensors to monitor the particular client equipment. For example, the client machine may include a display indicator to display an equipment state, and may utilize one or more internal monitoring features that update the display indicator as the equipment state changes. In this case, IoT device may monitor the display indicator (e.g., using an image sensor) to obtain an equipment state of the client machine. As another example, the client machine may include an RFID tag and/or a QR code capable of storing information indicating an equipment state, and the one or more sensors may monitor the RFID tag and/or the QR code to obtain the information indicating the equipment state.

In some cases, the IoT device may use an image sensor to capture a photograph of a client machine that does not include a display indicator. The photograph may include data identifying inconsistencies or degradation associated with the client machine. Additionally, the IoT device may be configured with information that allows the IoT device to process the photograph to determine an equipment state of the client equipment. For example, the IoT device may be configured with a specification detailing the structure of the client machine, may compare the photograph to the specification, and may determine an equipment state of the client machine based on whether an inconsistency or discrepancy is identified from the comparison.

In some implementations, the IoT device may use different sensors and/or different techniques to obtain and/or determine particular types of dynamic information. For example, the IoT device may obtain temperature information by using a temperature sensor and/or one or more software elements to take a temperature of a hardware component of particular client equipment. In this case, the IoT device may compare the temperature information to a threshold temperature level, and may determine an equipment state of the client equipment based on whether the threshold temperature level has been satisfied.

As another example, the IoT device may monitor traffic flow of a client device (e.g., a router, a switch, a hub, etc.), and may obtain link quality information by using a software element to determine a link quality value (e.g., a BER value, an FEC value, a CRC value, etc.). In this case, the IoT device may compare the link quality value to a threshold link quality value, and may determine an equipment state of the client equipment based on whether the threshold link quality value has been satisfied.

As another example, the IoT device may obtain information associated with movement or motion of client equipment using a movement sensor. For example, a client machine, while operating properly, may move at a particular speed. In this case, the IoT device may monitor the client machine to determine a speed at which the client machine is moving, and may compare the speed to the particular speed at which the client machine moves while operating properly. This may allow the IoT device to determine an equipment state based on the movement or motion of the client equipment.

In some implementations, the IoT device may determine an equipment state of the client equipment using any combination of the information described above and/or other similar types of information. For example, the IoT device may determine an equipment state by considering the structural information, the temperature information, the link quality information, and/or the like.

Additionally, or alternatively, one or more devices other than the IoT device or the client equipment may determine the equipment state of particular client equipment. For example, the IoT platform or the equipment management platform may determine the equipment state of the client equipment. In these examples, the IoT device may provide the structural information, the temperature information, the link quality information, the signal quality information, and/or the like, to the IoT platform and/or to the equipment management platform, where the IoT platform or the equipment management platform may utilize one or more of the above-described thresholds and/or algorithms needed to determine the equipment state.

In this way, the set of IoT devices are able to obtain or determine client equipment information for a set of client devices of the organization.

Figure 1B:
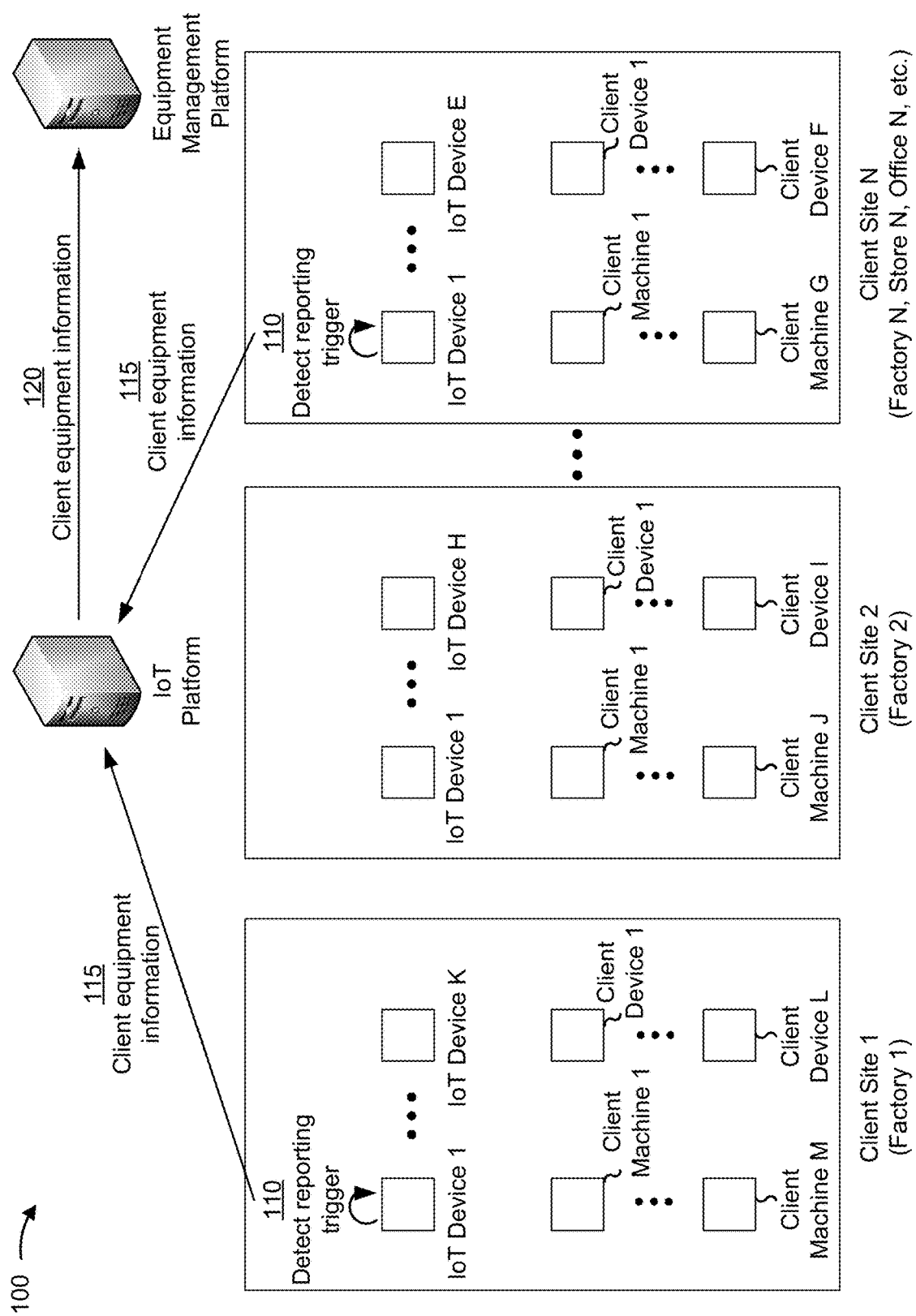

As shown in FIG. 1B, and by reference number 110, one or more IoT devices, of the set of IoT devices, may detect that a reporting trigger has been satisfied. For example, an IoT device may be configured with a reporting trigger that is satisfied if client equipment is in a particular equipment state, a reporting trigger that is satisfied if threshold amount of time has passed (e.g., the IoT device may be configured to report periodically at particular time periods), and/or the like.

As shown by reference number 115, one or more IoT devices, of the set of IoT devices, may provide the client equipment information to the IoT platform. For example, an IoT device may not have long-range communication capabilities (e.g., some IoT devices may only communicate via Bluetooth, NFC, etc.), which may prevent the IoT device from providing the client equipment information directly to the equipment management platform. In this case, the IoT device may provide the client equipment information (e.g., using a WAN interface, a NFC interface, etc.) to an IoT platform that is within range to receive the client equipment information. In some cases, each client site may have an IoT platform, whereby each IoT platform is able to receive client equipment information from IoT devices located at each client site. As shown by reference number 120, the IoT platform may provide the client equipment information to the equipment management platform.

In this way, the equipment management platform is able to receive the client equipment information for the set of client equipment, where the client equipment information includes dynamic values associated with equipment states of client equipment.

As shown in FIG. 1C, and by reference number 125, the equipment management platform may identify client equipment that has malfunctioned, predict client equipment that is to malfunction, and/or determine a cause of the malfunction. For example, the equipment management platform may, using one or more techniques described below, identify client equipment that has malfunctioned, predict client equipment that is to malfunction, and/or determine a cause of the malfunction. This may allow the equipment management platform to identify information that vendor organizations may use to offer solutions to fix or correct the malfunction, such as an identifier of client equipment that is malfunctioning, an identifier of a hardware component or element of the client equipment that is causing the malfunction, a make or a model number of the client equipment (and/or of a hardware component or a software element that is causing the malfunction), information describing a cause of a malfunction, and/or any other information that may be used by vendor organizations to make offers for equipment management services, as described further herein.

In some implementations, the equipment management platform may identify client equipment that has malfunctioned (e.g., client equipment that has failed or is operating in a non-normal manner) by processing the client equipment information. For example, if the client equipment and/or an IoT device is able to determine an equipment state, a component state, and/or an element state of the client equipment, the equipment management platform may read the equipment state to identify that the particular client equipment has malfunctioned.

Additionally, or alternatively, the equipment management platform may predict client equipment that is to malfunction. For example, the equipment management platform may train a machine learning model on historical equipment information and/or related information. Additionally, the machine learning model may be trained to identify trends associated with wear and tear of the client equipment. As such, the machine learning model may be able to identify properties or characteristics of client equipment that has yet to malfunction, but that is likely to malfunction within a certain time period. In this case, the equipment management platform may provide the client equipment information obtained from the IoT devices as input to the machine learning model, which may cause the machine learning model to output one or more values associated with a likelihood of the client equipment malfunctioning within a particular time period.

Additionally, or alternatively, the equipment management platform may determine a cause of the malfunction. For example, the equipment management platform may determine a cause of the malfunction using one or more threshold values. The one or more threshold values may serve as indicators of a particular malfunction. As an example, to determine that a fan has malfunctioned, the equipment management platform may be configured with a threshold temperature value, a threshold air flow value, and/or a threshold power level value (e.g., which may indicate that a battery powering the fan has died). As another example, if client equipment is a routing device (e.g., a router, a hub, a switch, etc.), a threshold bit error rate (BER) value (i.e., a high BER value), a threshold forward error correction (FEC) value (i.e., a high FEC value), and/or the like, may serve as indicators of low link quality (e.g., which may be a sign that a link or a circuit board needs to be repaired or replaced).

In this case, the equipment management platform may compare the client equipment information (e.g., the temperature information, the link quality information, and/or the like) to the one or more threshold values to determine the cause of the malfunction. For example, if a temperature value and/or an air flow value included in the client equipment information satisfy a threshold temperature value and/or threshold air flow value, the equipment management platform may determine that a fan within the particular client equipment has malfunctioned, that the fan may be the cause of a circuit board overheating, and/or the like.

As another example, the equipment management platform may determine a cause of the malfunction using a machine learning model. For example, the equipment management platform may train a machine learning model on historical client equipment information, historical equipment error information (e.g., indicating how client equipment malfunctioned, why client equipment malfunctioned, when client equipment malfunctioned, and/or the like). In this case, the equipment management platform may provide the client equipment information for the client equipment that has malfunctioned as input to the machine learning model, which may cause the machine learning model to output a value associated with a prediction of a cause of the malfunction.

Additionally, or alternatively, in some cases, the equipment management platform may be able to identify that client equipment is malfunctioning, but may not be able to determine a cause of the malfunction. In this case, the equipment management platform may generate a diagnostic report that may be provided to vendor organizations, as described further herein. The diagnostic report may include the client equipment information, information identifying one or more predictions as to possible causes of the malfunction, and/or the like.

In this way, the equipment management platform is able to identify client equipment that has malfunctioned, predict client equipment that is to malfunction, and/or determine a cause of the malfunction.

Figure 1D:
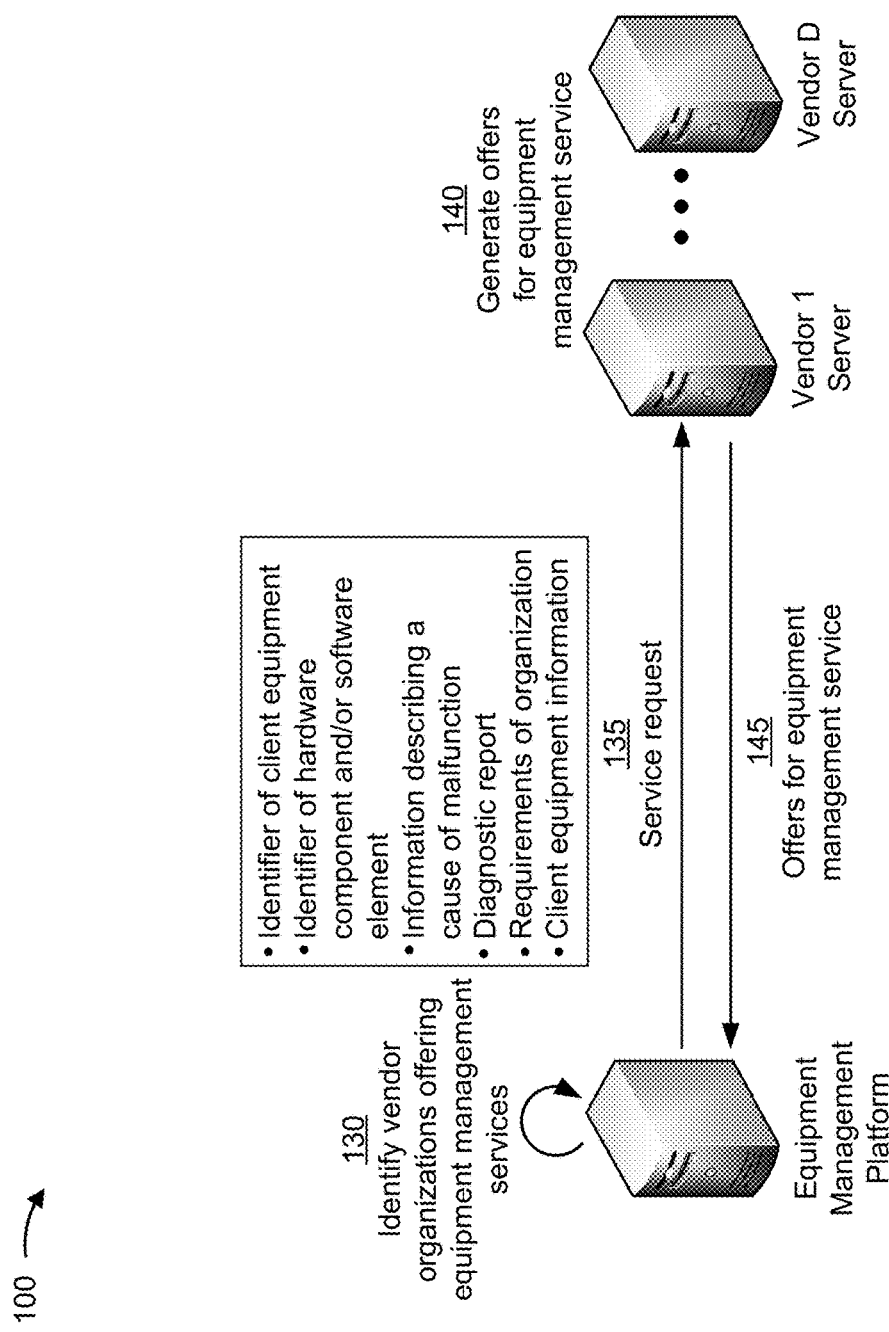

As shown in FIG. 1D, the equipment management platform may interact with the set of vendor devices (shown as Vendor 1 Server through Vendor D Server) to obtain information describing offers for a set of equipment management services. The offers for the set of equipment management services may be made by vendor organizations that are able to offer solutions to a particular malfunction. The set of equipment management services may include a repair service, a replacement service, a service recommending to purchase additional client equipment (in addition to existing client equipment), a service recommending to remove client equipment (e.g., without replacement), and/or the like.

As an example, the repair service may be a service to repair particular client equipment, to repair a hardware component of the particular client equipment, to repair a software element of the particular client equipment (e.g., by releasing a new version of the software element), and/or the like. As another example, the replacement service may be a service to replace the particular client equipment, to replace the hardware component of the particular client equipment, to replace the software element of the particular equipment, and/or the like.

As shown by reference number 130, the equipment management platform may identify vendor organizations offering equipment management services that are applicable to particular client equipment. For example, the equipment management platform may use a client equipment identifier for particular client equipment to search (e.g., query) a data source that associates the client equipment information for the particular client equipment with one or more vendor organizations that provide equipment management services for the particular client equipment. As an example, if a first vendor provides equipment management services for particular client equipment, a vendor identifier for the first vendor may be stored in association with the client equipment information for the particular client equipment.

Additionally, or alternatively, the vendor identifier may be associated with hardware components and/or software elements of the particular client equipment (e.g., certain vendors may only offer equipment management services for particular hardware components, particular software elements, etc.). In this way, if a particular hardware component or software element malfunctions, the equipment management platform is able to identify which vendor organizations offer equipment management services needed to address the malfunction.

Additionally, or alternatively, the vendor identifier may be associated with particular make or model numbers of equipment offered by the vendor organization. Additionally, or alternatively, location information for client equipment may be associated with location information of vendor organizations. In this way, the equipment management platform may be able to identify vendor organizations that are within a threshold distance of the client equipment that needs to be serviced.

As shown by reference number 135, the equipment management platform may provide a service request for display on an interface of a vendor device. The service request may include information identifying client equipment that is malfunctioning, information identifying a hardware component and/or a software element that is malfunctioning, information describing a cause of the malfunction (or a diagnostic report if the equipment management platform was unable to determine the cause), information describing whether the malfunction is or is likely to impact any other client equipment, requirements of the organization (e.g., a time within which the organization needs the client equipment to be repaired or replaced, a price range associated with a budget of the organization, etc.), the client equipment information, and/or the like. In some implementations, a vendor organization may only be permitted to access information if the organization has consented to the vendor organization receiving that information.

As shown by reference number 140, the set of vendor devices may be used to generate the offers for the set of equipment management services. For example, an employee of the vendor organization may view the interface to read a service request that is asking for a repair or a replacement of particular client equipment, a particular hardware component, a particular software component, and/or the like. In this case, the employee may generate an offer for an equipment management service based on the service request.

In some cases, the equipment management platform may have been unable to determine a cause of the malfunction. In this case, an equipment expert employed by a vendor organization may access the interface to read a diagnostic report that includes the client equipment information and/or any other information that the equipment management platform was able to obtain. Additionally, the equipment expert may be able to use his or her technical expertise to identify a cause, or else may generate an offer to have a technician perform an assessment of the client equipment.

Additionally, or alternatively, one or more of the vendor devices may automatically determine the best-fit equipment management service to offer. For example, the one or more vendor devices may process the information describing the cause of the malfunction, the diagnostic report, the requirements of the organization, and/or the client equipment information using a service identification application that is able to automatically determine the best-fit equipment management service to offer the organization. As shown by reference number 145, the set of vendor devices may provide the offers for the equipment management services to the equipment management platform.

In this way, the equipment management platform is able to obtain offers for a set of equipment management services that are based on information included in a service request.

Figure 1E:
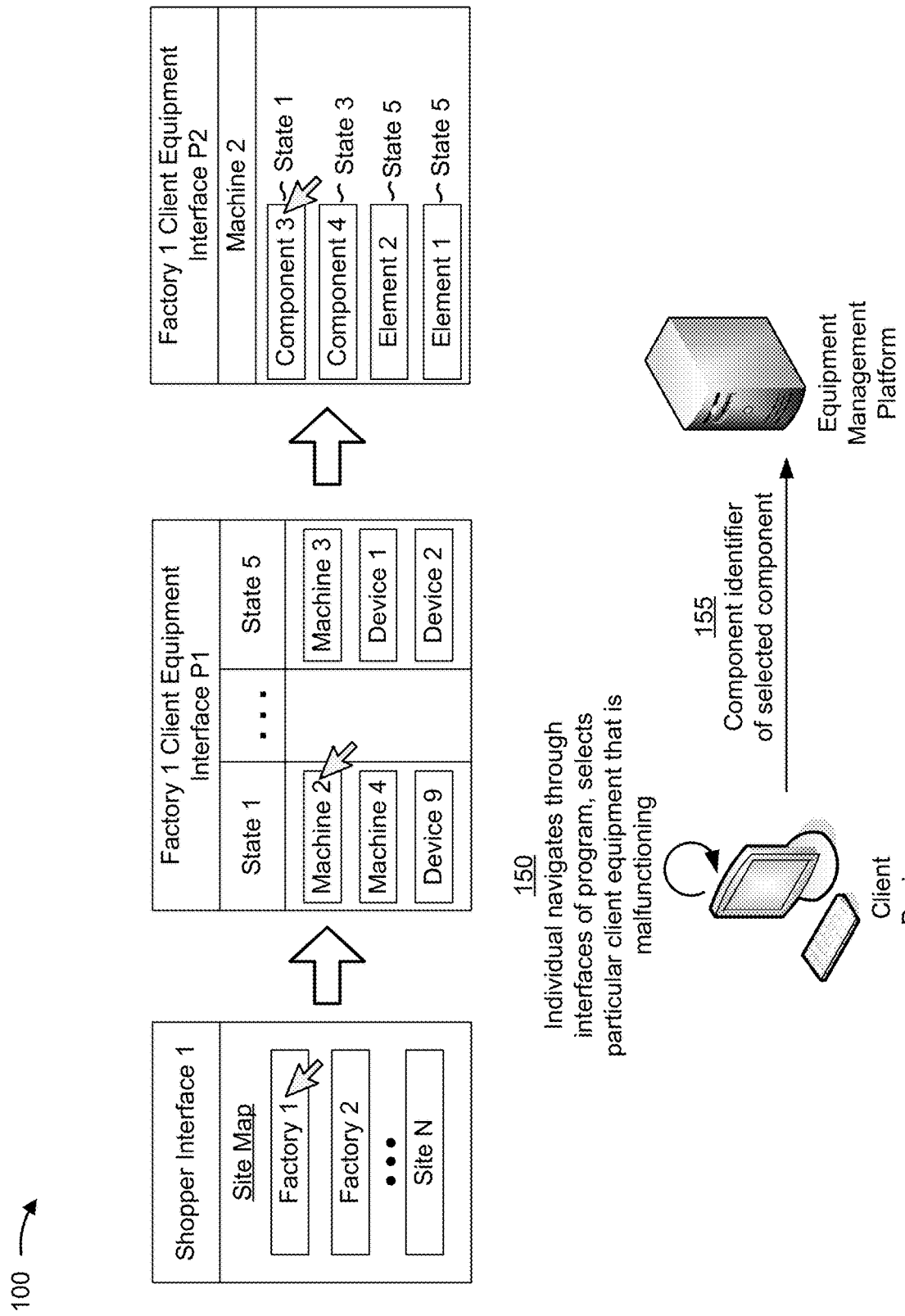

As shown in FIG. 1E, and by reference number 150, an individual may navigate through a set of interfaces, provided by the equipment management platform, to select a hardware component of particular client equipment that is malfunctioning. For example, the individual (e.g., an equipment manager of the organization) may log in to an interface to monitor equipment states of a group of client equipment that the individual is tasked with managing. In this case, the individual may input login information into a login interface (e.g., a username, a password, etc.), which may cause a first interface to be displayed on the client device.

As shown as an example, the first interface may display a site map that allows the individual to select a client site. In this example, the individual may interact with the first interface to select the first client site (shown by the cursor hovering over and clicking on the Factory 1 button).

The individual selecting the first client site may cause a second interface to be displayed on the client device, which includes a list of client equipment that are located at the first client site. In this case, the list of client equipment may be ordered based on a degree of severity of equipment states of the client equipment, and the individual may interact with the second interface to select particular client equipment (shown by the cursor hovering over and clicking on the Machine 2 button). In some cases, the list of client equipment may be color coordinated. For example, client equipment in a first equipment state may be listed in red, client equipment in a second state may be listed in yellow, and client equipment in a third equipment state may be listed in green.

The individual selecting the particular client equipment may cause a third interface to be displayed on the client device (or may cause a popup on the second interface), which includes a list of hardware components and/or software elements of the particular client equipment that has been selected. In this case, the list of hardware components and/or software elements may be ordered based on a degree of severity of the equipment states of each hardware component and/or software element, and the individual may interact with the third interface (or the popup of the second interface) to select a component of the particular client equipment (shown by the cursor hovering over and selecting Component 3 of Machine 2).

As shown by reference number 155, when the individual selects the hardware component of the particular client equipment, the equipment management platform may receive a component identifier for the hardware component. This may allow the equipment management platform to identify particular vendor organizations that are offering equipment management services for the hardware component, as described further herein.

In this way, the individual is able to view the information for location-specific client equipment (e.g., client equipment located at a particular client site), is able to view information identifying equipment states of a group of client equipment, and is able to view the information in an order based on the severity of the equipment states.

As shown in FIG. 1F, after the individual selects the hardware component of the particular client equipment, the client device may display a fourth interface that includes a set of shopping parameters. The set of shopping parameters may allow the equipment management platform to identify equipment management services that are tailored to preferences of the individual. The set of shopping parameters may include a parameter indicating a preferred brand of client equipment, a preferred price range, a preferred time in which the individual expects a selected equipment management service to be performed, and/or the like.

As shown by reference number 160, the individual may interact with the fourth interface to select one or more shopping parameters, of the set of shopping parameters, and may request a list of prospective equipment management services for the particular client equipment (as shown by the cursor hovering over and selecting a button used to submit the request). As shown by reference number 165, the request may be received by the equipment management platform, and may include the one or more shopping parameters that have been selected. As shown by reference number 170, the equipment management platform may store the one or more shopping parameters as shopper preferences of the individual.

In some implementations, the equipment management platform may provide, for display on the client device, a fourth interface that includes pre-selected shopping parameters. For example, the equipment management platform may provide, as part of the fourth interface, information indicating previously selected shopping parameters of the individual. In some cases, configured shopping parameters may have been provided to the one or more vendor organizations as part of the service request (e.g., the information indicating the requirements of the organization).

In some implementations, the equipment management platform may predict shopper preferences for the individual using a machine learning technique. For example, the equipment management platform may train a machine learning model on historical information relating to preferences of users within the organization and/or within other organizations. In this case, the equipment management platform may provide, as input to the machine learning model, user profile information for the individual to cause the machine learning model to output values that may be used to generate predicted shopper preferences for the individual.

In some implementations, the equipment management platform may notify the organization about particular client equipment based on one or more conditions. For example, rather than waiting for the individual to log in to the program to select the particular client equipment, the equipment management platform may be configured with one or more conditions that, if satisfied, cause the equipment management platform to proactively notify the organization about particular client equipment that may need to be serviced. The one or more conditions may include a first condition that is satisfied if client equipment is classified into a particular equipment state (e.g., the first equipment state), a second condition that is satisfied if a threshold number of vendor organizations have provided offers, a third condition that is satisfied if a threshold amount of time passes after the first condition is satisfied, and/or the like.

In this way, the equipment management platform is able to receive, identify, and/or determine shopper preferences for the individual, which may be used to identify equipment management services that are tailored to the preferences of the individual.

Figure 1G:
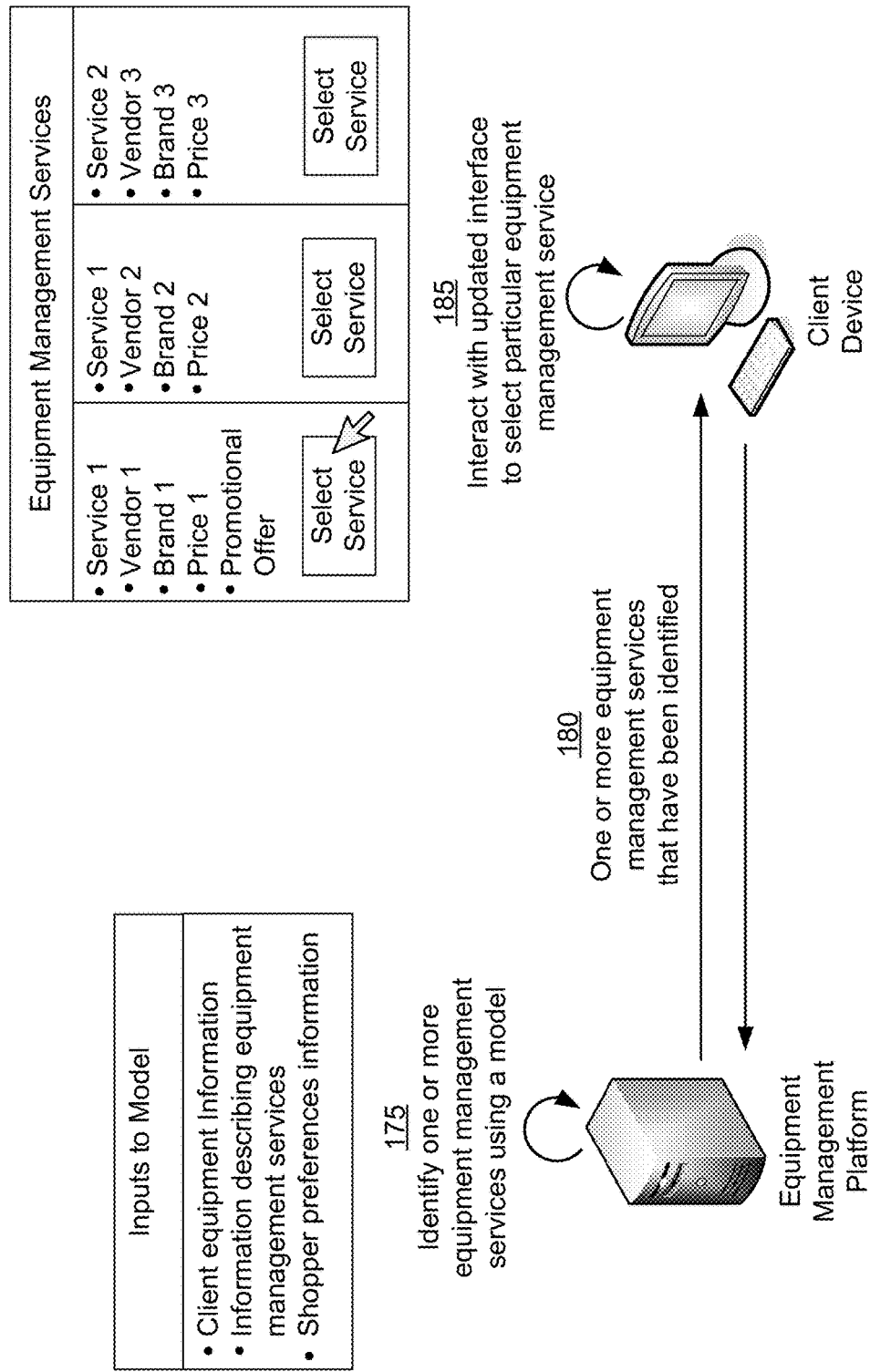

As shown in FIG. 1G, and by reference number 175, the equipment management platform may identify one or more equipment management services using a model. For example, the equipment management platform may train or be configured with a model that is able to identify one or more optimal equipment management services, of the set of equipment management services that are being offered. The model may be a parameter-driven model (e.g., a model capable of sorting, identifying, and/or recommending information), a machine learning model, and/or the like.

In some implementations, the equipment management platform may identify one or more equipment management services using a parameter-driven model. For example, the equipment management platform may train or be configured with a parameter-driven model that is able to use input parameters to sort through the offers for the set of equipment management services to identify the one or more equipment management services that satisfy with the input parameters. In this case, the equipment management platform may use the parameter-driven model to identify offers for particular equipment management services that are applicable to the particular client equipment selected by the individual, identify if particular equipment management services are within a threshold location of the particular client equipment, identify if particular equipment management services satisfy one or more shopper preferences, and/or the like.

In some implementations, the equipment management platform may identify one or more equipment management services using a machine learning model. For example, the equipment management platform may identify one or more equipment management services using a machine learning model that has been trained on historical information. The historical information may include historical client equipment information, information describing historical equipment management services, historical maintenance or repair information for the historical equipment management services, and/or the like.

In this case, the equipment management platform may provide, as input to the machine learning model, the client equipment information for the particular client equipment, the information describing the set of equipment management services, shopper preferences information for the individual, and/or the like. This may cause the model to output, for each equipment management service of the set of equipment management services, a likelihood of an equipment management service being selected by the individual.

In some implementations, the equipment management platform may use the model to identify equipment management services before the individual accesses the program. For example, the equipment management platform may use the model to identify equipment management services if one or more of the above-described conditions are satisfied. In this case, if one or more of the conditions are satisfied for particular client equipment (or for a particular hardware component or software element of the particular client equipment), the equipment management platform may use the model to identify the one or more equipment management services. Additionally, the equipment management platform may provide, to a client device, a notification indicating that one or more offered equipment management services have been identified and may be worth considering.

As shown by reference number 180, the equipment management platform may provide information identifying the one or more equipment management services that have been identified for display via a fifth interface. As shown by reference number 185, the individual may interact with the fifth interface to select a particular equipment management service (shown by the cursor hovering over and selecting a Select Service button associated with Vendor 1).

In this way, the equipment management platform is able to use a model to identify equipment management services that are tailored to the individual, thereby increasing a speed at which the individual selects the particular equipment management service, increasing a likelihood of the individual finding a preferred equipment management service, decreasing an amount of lost productivity or a likelihood of lost productivity of the organization (e.g., that may be caused by client equipment malfunctioning or continuing to malfunction), and/or the like. Furthermore, the equipment management platform conserves processing resources and/or network resources that might otherwise be used to select non-optimal equipment management services, re-select new equipment management services after an initial non-optimal equipment management service was unable to fix the client equipment, and/or the like.

As shown in FIG. 1H, and by reference number 190, the equipment management platform may perform one or more actions associated with assisting in performance or delivery of the particular equipment management service that has been selected. For example, and shown by reference number 190-1, the equipment management platform may provide, to a device associated with a vendor organization that is offering the particular equipment management service that has been selected (shown as Vendor 1 Server), a notification that that the particular equipment management service has been selected. This may allow the vendor organization to schedule delivery and/or performance of the particular equipment management service.

Additionally, or alternatively, and as shown by reference number 190-2, the equipment management platform may schedule delivery and/or performance of the particular equipment management service that has been selected. For example, if the particular management service is to repair or replace the component of the particular client equipment selected by the individual (e.g., Component 3 of Machine 2), the equipment management platform may generate a work order, and may provide the work order to a party that is to deliver and/or perform the particular equipment management service. In this case, the equipment management platform may generate the work order using scheduling information associated with the first site of the client organization, scheduling information associated with the vendor organization (e.g., availability of service technicians, machines capable of performing automated services, etc.), qualification information of service technicians, and/or the like.

In some cases, such as when a service technician of the vendor organization is to perform the service, the work order may be provided to a device or account associated with the service technician (e.g., an e-mail address of the service technician, etc.). Additionally, the equipment management platform may generate a calendar event for the particular equipment management service, and may provide the calendar event to an electronic calendar associated with the account of the service technician.

In other cases, such as when a device associated with the vendor is capable of performing an automated service, the work order may be provided to the device to cause the device to automatically perform the particular equipment management service. As an example, assume the particular equipment management service is to repair a software element of the particular client equipment by installing an updated version of the software element. In this case, the equipment management platform may generate the work order, and may provide the work order to a vendor server capable of performing the software installation. This may cause the vendor server to use an application programming interface (API) to automatically install the updated version of the software element.

Additionally, or alternatively, the equipment management platform may cause a part (e.g., replacement equipment, a replacement hardware component, etc.) to be automatically delivered to a particular client site. In this case, the equipment management platform may generate navigation instructions to deliver the part to the particular client site, and may provide the navigation instructions to a party or device capable of performing the delivery. As an example, the equipment management platform may provide the navigation instructions to a delivery vehicle to allow the delivery vehicle to use the navigation instructions to deliver the part. In some cases, the delivery vehicle may be a drone, an autonomous vehicle, and/or a device capable of automatically delivering the part to the particular client site.

In this way, the equipment management platform is able to intelligently provide the client device with a program that offers for equipment management services that are based on the client equipment information (e.g., based on a current equipment state of the client equipment, the age of the client equipment, etc.). Furthermore, by assisting in delivery and/or performance of the particular equipment management service, the equipment management platform ensures that client equipment is serviced in a timely manner, conserves processing resources and/or network resources that might otherwise be used to manage client equipment failure if the client equipment was not serviced in a timely manner, and/or the like.

As indicated above, FIGS. 1A-1H are provided merely as an example. Other examples are possible and may differ from what was described with regard to FIGS. 1A-1H. For example, there may be additional devices and/or networks, fewer devices and/or networks, different devices and/or networks, or differently arranged devices and/or networks than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) of example implementations 100 may perform one or more functions described as being performed by another set of devices of example implementations 100.

Figure 2:
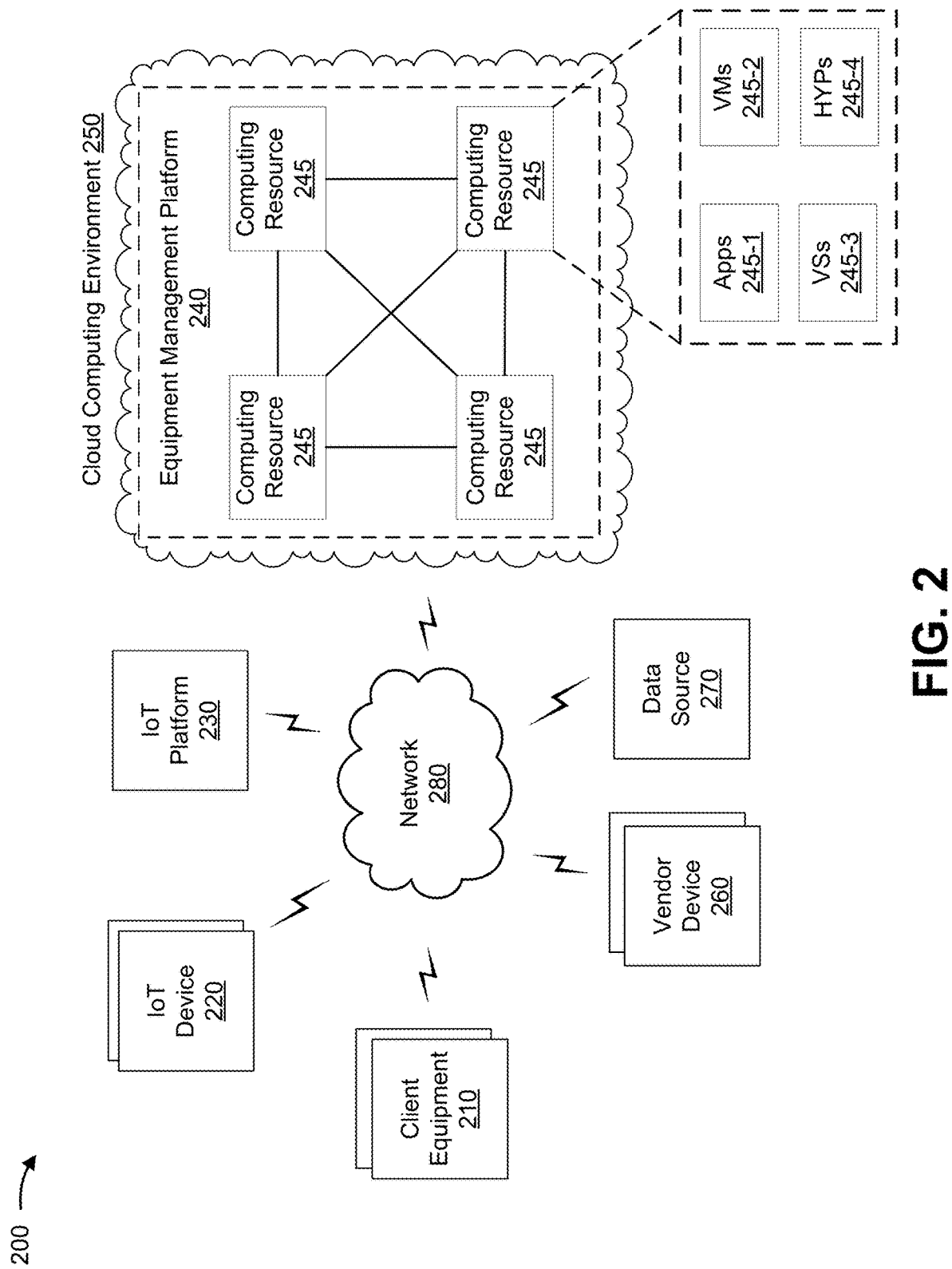
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client equipment 210, an IoT device 220, an IoT platform 230, an equipment management platform 240 hosted in a cloud computing environment 250, a vendor device 260, a data source 270, and/or a network 280. Devices of environment 200 may interconnect via wired connections, wireless connections, or a combination of wired and wireless connections.

Client equipment 210 includes one or more devices capable of receiving, storing, generating, processing, and/or providing information associated with client equipment. For example, client equipment 210 may include a set of client machines and/or a set of client devices. The set of client machines may include any machine used to help an organization create, manage, market, distribute, and/or maintain a product or a service, such as factory machine, a machine found in a retail store, a machine found in a transportation vehicle, and/or the like. The set of client devices may include a communication and/or computing device, such as a mobile phone (e.g., a smart phone, a radiotelephone, etc.), a laptop computer, a tablet computer, a handheld computer, a server computer, a gaming device, a wearable communication device (e.g., a smart wristwatch, a pair of smart eyeglasses, etc.), a router, a switch, a hub, a firewall, a gateway, a server device or a group of server devices, or a similar type of device.

In some implementations, client equipment 210 may be monitored by IoT device 220. Additionally, or alternatively, client equipment 210 may be IoT device 220. In some implementations, client equipment 210 may include a client device that may be used to access the program that provides an organization with offers for a set of equipment management services. In some implementations, client equipment 210 may include a radio-frequency identification (RFID) tag and/or a quick response (QR) code that may store information monitored by IoT device 220.

IoT device 220 includes one or more devices capable of receiving, storing, generating, processing, and/or providing information associated with client equipment. For example, IoT device 220 may include a set of sensors (e.g., a location sensor, an image sensor, a temperature sensor, a power sensor, a sensor capable of measuring electrical signals, such as a voltage sensor, a resistance sensor, etc.), a set of smart devices capable of communicating using a communication interface (e.g., a wireless access network (WAN) connection, a connection utilizing fear-field communication (NFC), a Wi-Fi connection, etc.), and/or the like. In some implementations, IoT device 220 may include a set of software elements, such as an application to measure a particular hardware component of client equipment, an application to determine a value associated with measuring quality of data transmission of the client equipment, an application capable of interacting with a radio-frequency identification (RFID) tag and/or a quick response (QR) code, and/or the like.

In some implementations, IoT device 220 may obtain client equipment information from client equipment 210. In some implementations, IoT device 220 may provide the client equipment information to IoT platform 230.

IoT platform 230 includes one or more devices capable of receiving, storing, generating, processing, and/or providing client equipment information. For example, IoT platform 230 may include a server device or a group of server devices. In some implementations, IoT platform 230 may provide client equipment information to equipment management platform 240.

Equipment management platform 240 includes one or more devices capable of receiving, storing, generating, processing, and/or providing information associated with a set of client equipment. For example, equipment management platform 240 may include a server device (e.g., a host server, a web server, an application server, etc.), a data center device, or a similar device. In some implementations, equipment management platform 240 may receive, store, generate, process, and/or provide information associated with a set of client equipment, as described in FIGS. 1A-1H, FIGS. 4-6, and/or the like.

Cloud computing environment 250 includes an environment that delivers computing as a service, whereby shared resources, services, etc. may be provided to client equipment 210 and/or vendor device 260. Cloud computing environment 250 may provide computation, software, data access, storage, and/or other services that do not require end-user knowledge of a physical location and configuration of a system and/or a device that delivers the services. As shown, cloud computing environment 250 may include equipment management platform 240 and a set of computing resources 245.

Computing resource 245 includes one or more personal computers, workstation computers, server devices, or another type of computation and/or communication device. In some implementations, computing resource 245 may host equipment management platform 240. The cloud resources may include compute instances executing in computing resource 245, storage devices provided in computing resource 245, data transfer devices provided by computing resource 245, and/or the like. In some implementations, computing resource 245 may communicate with other computing resources 245 via wired connections, wireless connections, or a combination of wired and wireless connections.

As further shown in FIG. 2, computing resource 245 may include a group of cloud resources, such as one or more applications ("APPs") 245-1, one or more virtual machines ("VMs") 245-2, virtualized storage ("VSs") 245-3, one or more hypervisors ("HYPs") 245-4, or the like.

Application 245-1 includes one or more software applications that may be provided to or accessed by client equipment 210 and/or vendor device 260. Application 245-1 may eliminate a need to install and execute the software applications on client equipment 210 and/or vendor device 260. For example, application 245-1 may include software associated with equipment management platform 240 and/or any other software capable of being provided via cloud computing environment 250. In some implementations, one application 245-1 may send/receive information to/from one or more other applications 245-1, via virtual machine 245-2.

Virtual machine 245-2 includes a software implementation of a machine (e.g., a computer) that executes programs like a physical machine. Virtual machine 245-2 may be either a system virtual machine or a process virtual machine, depending upon use and degree of correspondence to any real machine by virtual machine 245-2. A system virtual machine may provide a complete system platform that supports execution of a complete operating system ("OS"). A process virtual machine may execute a single program, and may support a single process. In some implementations, virtual machine 245-2 may execute on behalf of a user (e.g., client equipment 210 and/or vendor device 260), and may manage infrastructure of cloud computing environment 250, such as data management, synchronization, or long-duration data transfers.

Virtualized storage 245-3 includes one or more storage systems and/or one or more devices that use virtualization techniques within the storage systems or devices of computing resource 245. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 245-4 provides hardware virtualization techniques that allow multiple operating systems (e.g., "guest operating systems") to execute concurrently on a host computer, such as computing resource 245. Hypervisor 245-4 may present a virtual operating platform to the guest operating systems, and may manage the execution of the guest operating systems. Multiple instances of a variety of operating systems may share virtualized hardware resources.

Vendor device 260 includes one or more devices capable of receiving, storing, generating, processing, and/or providing information associated with equipment management services. For example, vendor device 260 may include a server device or a group of server device, a desktop computer, a laptop computer, a mobile device (e.g., a smart phone, a radio telephone, etc.), and/or a similar type of device.

Data source 270 includes one or more devices capable of receiving, storing, generating, processing, and/or providing information associated with client equipment. For example, data source 270 may include a server device or a group of server devices. In some implementations, data source 270 may store client equipment information, information describing a set of client management services, user preferences information, repair or maintenance information, historical information, and/or the like.

Network 280 includes one or more wired and/or wireless networks. For example, network 280 may include a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
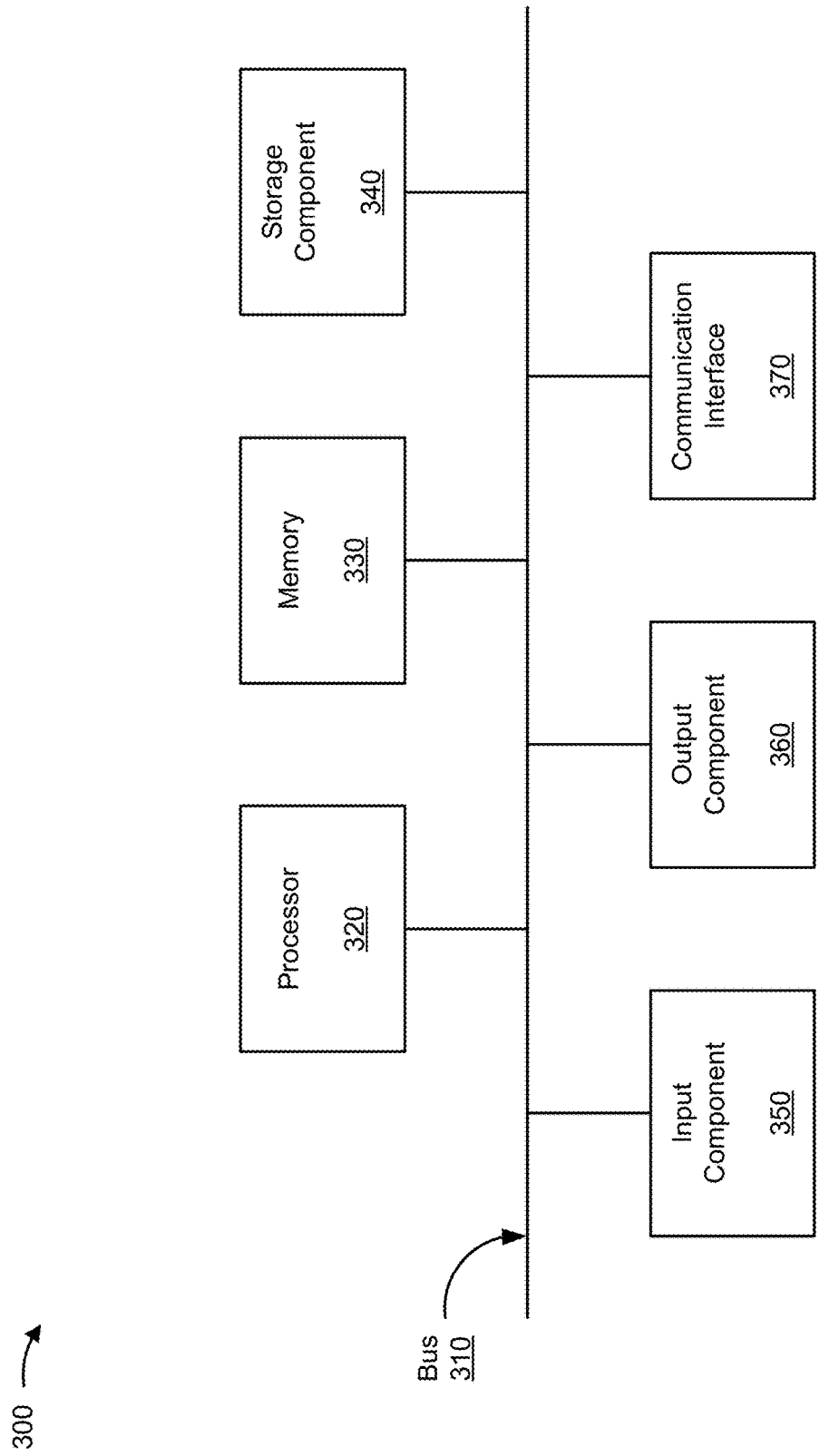
FIG. 3 is a diagram of example components of one or more devices of FIG. 2.

FIG. 3 is a diagram of example components of a device 300. Device 300 may correspond to client equipment 210, IoT device 220, IoT platform 230, equipment management platform 240, computing resource 245, vendor device 260, and/or data source 270. In some implementations client equipment 210, IoT device 220, IoT platform 230, equipment management platform 240, computing resource 245, vendor device 260, and/or data source 270 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
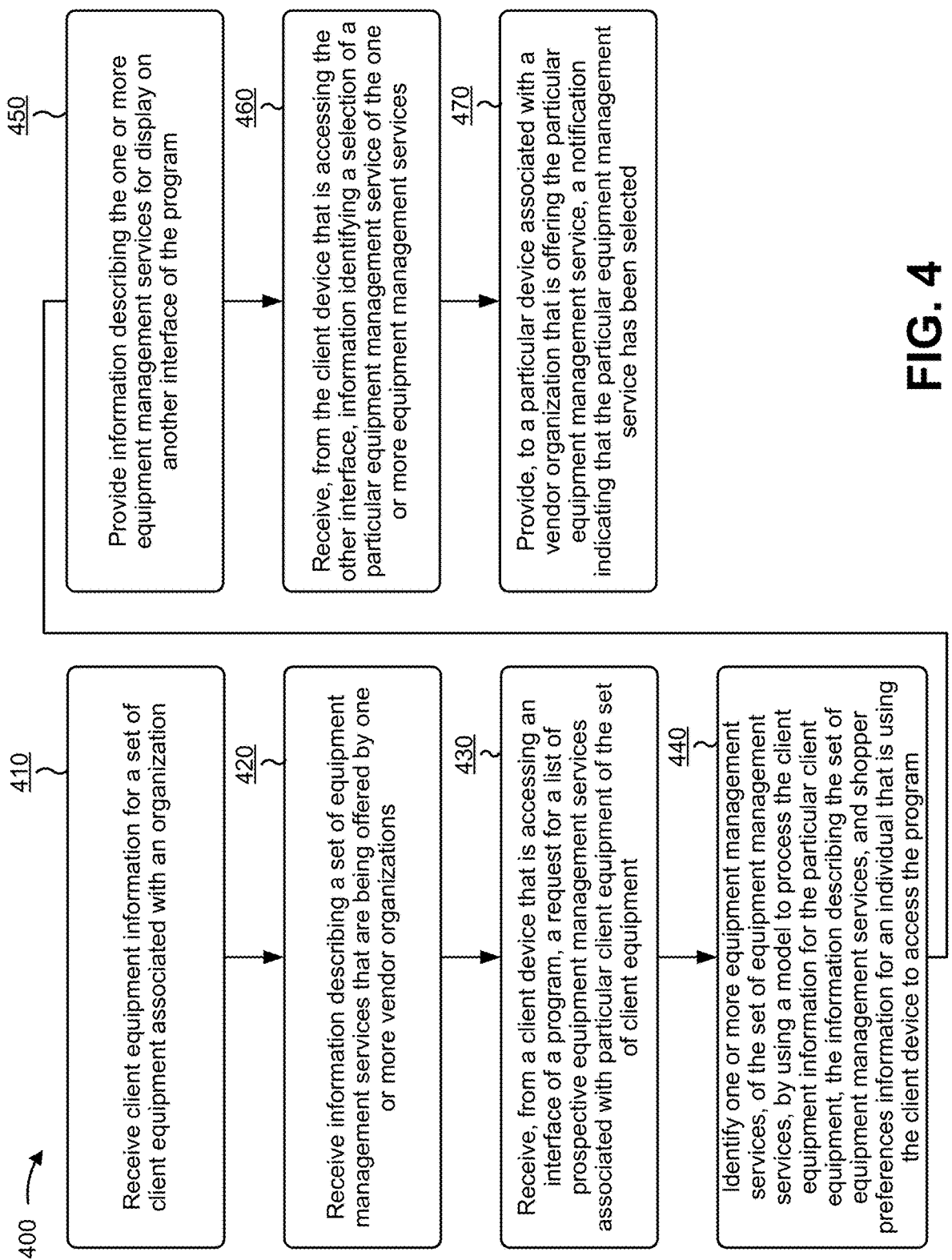

FIG. 4 is a flow chart of an example process 400 for dynamically updating a set of interfaces of a program that is used to display one or more equipment management services that are being offered to an organization based on a state of client equipment associated with the organization. In some implementations, one or more process blocks of FIG. 4 may be performed by an equipment management platform (e.g. equipment management platform 240). In some implementations, one or more process blocks of FIG. 4 may be performed by another device or a group of devices separate from or including the equipment management platform, such as client equipment (e.g. client equipment 210), an IoT device (e.g. IoT device 220), an IoT platform (e.g. IoT platform 230), a vendor device (e.g. vendor device 260), and/or a data source (e.g. data source 270).

As shown in FIG. 4, process 400 may include receiving client equipment information for a set of client equipment associated with an organization (block 410). For example, the equipment management platform (e.g., equipment management platform 240, using processor 320, memory 330, input component 350, communication interface 370, etc.) may receive client equipment information for a set of client equipment (e.g., a set of client equipment 210) associated with an organization. In some implementations, the client equipment information may include information identifying an equipment state.

As further shown in FIG. 4, process 400 may include receiving information describing a set of equipment management services that are being offered by one or more vendor organizations (block 420). For example, the equipment management platform (e.g., equipment management platform 240, using processor 320, memory 330, input component 350, communication interface 370, etc.) may receive information describing a set of equipment management services that are being offered by one or more vendor organizations. In some implementations, the set of equipment management services may be offered based on the client equipment information.

As further shown in FIG. 4, process 400 may include receiving, from a client device that is accessing an interface of a program, a request for a list of prospective equipment management services associated with particular client equipment of the set of client equipment (block 430). For example, the equipment management platform (e.g., equipment management platform 240, using processor 320, memory 330, input component 350, communication interface 370, etc.) may receive, from a client device that is accessing an interface of a program, a request for a list of prospective equipment management services associated with particular client equipment of the set of client equipment. In some implementations, the program may be used to allow the one or more vendor organizations to offer the set of equipment management services to the organization.

As further shown in FIG. 4, process 400 may include identifying one or more equipment management services, of the set of equipment management services (e.g., for the list of prospective equipment management services), by using a model to process the client equipment information for the particular client equipment, the information describing the set of equipment management services, and shopper preferences information for an individual that is using the client device to access the program (block 440). For example, the equipment management platform (e.g., equipment management platform 240, using computing resource 245, processor 320, etc.) may identify one or more equipment management services, of the set of equipment management services, for the list of prospective equipment management services, by using a model to process the client equipment information for the particular client equipment (e.g., a particular client equipment 210 of the set of client equipment 210), the information describing the set of equipment management services, and shopper preferences information for an individual that is using the client device to access the program.

As further shown in FIG. 4, process 400 may include providing information describing the one or more equipment management services for display on another interface of the program (block 450). For example, the equipment management platform (e.g., equipment management platform 240, using processor 320, output component 360, communication interface 370, etc.) may provide information describing the one or more equipment management services for display on another interface of the program.

As further shown in FIG. 4, process 400 may include receiving, from the client device that is accessing the other interface, information identifying a selection of a particular equipment management service of the one or more equipment management services (block 460). For example, the equipment management platform (e.g., equipment management platform 240, using processor 320, memory 330, input component 350, communication interface 370, etc.) may receive, from the client device that is accessing the other interface, information identifying a selection of a particular equipment management service of the one or more equipment management services.

As further shown in FIG. 4, process 400 may include providing, to a particular device associated with a vendor organization that is offering the particular equipment management service, a notification indicating that the particular equipment management service has been selected (block 470). For example, the equipment management platform (e.g., equipment management platform 240, using processor 320, output component 360, communication interface 370, etc.) may provide, to a particular device associated with a vendor organization that is offering the particular equipment management service (e.g., vendor device 260), a notification indicating that the particular equipment management service has been selected.

Process 400 may include additional aspects, such as any single aspect or any combination of aspects described below and/or in connection with one or more other processes described elsewhere herein.

In some implementations, the information identifying the equipment state of the particular client equipment may include information identifying a first state associated with equipment failure that is capable of affecting other client equipment, information identifying a second state associated with equipment failure that is unable to affect the other client equipment, or information identifying a third state associated with a prediction of equipment failure.

In some implementations, the equipment management platform may sort the set of equipment management services that have been received based on a degree of severity of the equipment state. Additionally, the equipment management platform may provide the set of equipment management services that have been sorted for display on the interface.

In some implementations, the interface may be a first interface and the other interface may be a second interface. In this case, the equipment management platform may generate, after receiving the information describing the set of equipment management services, a set of shopping parameters that are to be displayed via a third interface of the program. Additionally, the equipment management platform may receive, from the client device, information indicating one or more shopping parameters that have been selected from the set of shopping parameters. In some implementations, the information indicating the one or more shopping parameters may be used by the model as the shopper preferences information for the individual.

In some implementations, the equipment management platform may identify, after receiving the client equipment information, vendor organizations that are within a threshold distance of the particular client equipment. In some implementations, the equipment management platform may provide the client equipment information for the particular client equipment to one or more devices associated with the vendor organizations that are within the threshold distance of the particular client equipment. Additionally, while receiving the information describing the set of equipment management services, the equipment management platform may receive the information describing the set of equipment management services from the one or more devices associated with the vendor organizations.

In some implementations, the equipment management platform may provide, as part of the information describing the one or more equipment management services, information describing one or more promotional offers that are based on the equipment state of the particular client equipment.

In some implementations, the equipment management platform may automatically schedule performance or delivery of the particular equipment management service that has been selected.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for dynamically updating a set of interfaces of a program that is used to display one or more equipment management services that are being offered to an organization based on a state of client equipment associated with the organization. In some implementations, one or more process blocks of FIG. 5 may be performed by an equipment management platform (e.g. equipment management platform 240). In some implementations, one or more process blocks of FIG. 5 may be performed by another device or a group of devices separate from or including the equipment management platform, such as a client equipment (e.g. client equipment 210), an IoT device (e.g. IoT device 220), an IoT platform (e.g. IoT platform 230), a vendor device (e.g. vendor device 260), and/or a data source (e.g. data source 270).

As shown in FIG. 5, process 500 may include providing, for display via a first interface, of a set of interfaces of a program, client equipment information for a set of client equipment associated with an organization (block 510). For example, the equipment management platform (e.g., equipment management platform 240, using processor 320, output component 360, communication interface 370, etc.) may provide, for display via a first interface, of a set of interfaces of a program, client equipment information for a set of client equipment (e.g., a set of client equipment 210) associated with an organization. In some implementations, the client equipment information for each client equipment, of the set of client equipment, may include information identifying an equipment state. In some implementations, the first interface may be provided based on receiving the client equipment information.

As further shown in FIG. 5, process 500 may include receiving information describing a set of equipment management services that are being offered by one or more vendor organizations (block 520). For example, the equipment management platform (e.g., equipment management platform 240, using processor 320, memory 330, input component 350, communication interface 370, etc.) may receive information describing a set of equipment management services that are being offered by one or more vendor organizations. In some implementations, the set of equipment management services being offered may be based on the client equipment information.

As further shown in FIG. 5, process 500 may include receiving, from a client device that is accessing the first interface of the program, a request for a list of prospective equipment management services associated with particular client equipment of the set of client equipment (block 530). For example, the equipment management platform (e.g., equipment management platform 240, using processor 320, memory 330, input component 350, communication interface 370, etc.) may receive, from a client device that is accessing the first interface of the program, a request for a list of prospective equipment management services associated with particular client equipment of the set of client equipment (e.g., particular client equipment 210 of the set of client equipment 210).

As further shown in FIG. 5, process 500 may include identify one or more equipment management services, of the set of equipment management services (for the list of prospective equipment management services), by using a model to process the client equipment information for the particular client equipment, the information describing the set of equipment management services, and shopper preferences information for an individual that is using the client device to access the program (block 540). For example, the equipment management platform (e.g., equipment management platform 240, using computing resource 245, processor 320, etc.) may identify one or more equipment management services, of the set of equipment management services, for the list of prospective equipment management services, by using a model to process the client equipment information for the particular client equipment, the information describing the set of equipment management services, and shopper preferences information for an individual that is using the client device to access the program.

As further shown in FIG. 5, process 500 may include providing, for display via a second interface, of the set of interfaces of the program, the information describing the one or more equipment management services (block 550). For example, the equipment management platform (e.g., equipment management platform 240, using processor 320, output component 360, communication interface 370, etc.) may provide, for display via a second interface, of the set of interfaces of the program, the information describing the one or more equipment management services.

As further shown in FIG. 5, process 500 may include receiving, from the client device that is accessing the second interface, information identifying a selection of a particular equipment management service of the one or more equipment management services (block 560). For example, the equipment management platform (e.g., equipment management platform 240, using processor 320, memory 330, input component 350, communication interface 370, etc.) may receive, from the client device that is accessing the second interface, information identifying a selection of a particular equipment management service of the one or more equipment management services.

As further shown in FIG. 5, process 500 may include providing, to a particular device associated with a vendor organization that is offering the particular equipment management service, a notification indicating that the particular equipment management service has been selected (block 570). For example, the equipment management platform (e.g., equipment management platform 240, using processor 320, output component 360, communication interface 370, etc.) may provide, to a particular device associated with a vendor organization that is offering the particular equipment management service (e.g., vendor device 260), a notification indicating that the particular equipment management service has been selected.

Process 500 may include additional aspects, such as any single aspect or any combination of aspects described below and/or in connection with one or more other processes described elsewhere herein.

In some implementations, the client equipment information for a group of client equipment, of the set of client equipment, may include information identifying one or more component states of components of the group of client equipment. In some implementations, the equipment management platform may provide the client equipment information for the group of client equipment to one or more devices associated with particular vendor organizations, of the one or more vendor organizations, that offer component management services for the group of client equipment. In some implementations, the equipment management platform may receive information describing the component management services from the one or more devices associated with the particular vendor organizations.

In some implementations, the equipment management platform may analyze the information describing the set of equipment management services to generate a set of shopping parameters. In some implementations, the equipment management platform may provide, for display via a third interface, of the set of interfaces of the program, the set of shopping parameters. In some implementations, the equipment management platform may receive, from the client device that is accessing the third interface, information indicating a selection of one or more shopping parameters of the set of shopping parameters. Additionally, then identifying the one or more equipment management services, the equipment management platform may use the one or more shopping parameters as the shopper preferences information for the individual.

In some implementations, the equipment management platform may generate the first interface to display the client equipment information based on a degree of severity of the equipment state. In some implementations, a set of colors may be provided as part of the first interface to illustrate the degree of severity of the equipment status.

In some implementations, the information describing the one or more equipment management services may include one or more promotional offers that are based on the equipment state of the particular client equipment. In some implementations, the equipment management platform may provide, for display via the second interface, the one or more promotional offers that are based on the equipment state of the particular client equipment.

In some implementations, the equipment management platform may generate a work order that includes instructions for performing the particular equipment management service. In some implementations, the equipment management platform may provide the work order to the particular device associated with the vendor organization that is offering the particular equipment management service.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for dynamically updating a set of interfaces of a program that is used to display one or more equipment management services that are being offered to an organization based on a state of client equipment associated with the organization. In some implementations, one or more process blocks of FIG. 6 may be performed by an equipment management platform (e.g. equipment management platform 240). In some implementations, one or more process blocks of FIG. 6 may be performed by another device or a group of devices separate from or including the equipment management platform, such as a client equipment (e.g. client equipment 210), an IoT device (e.g. IoT device 220), an IoT platform (e.g. IoT platform 230), a vendor device (e.g. vendor device 260), and/or a data source (e.g. data source 270).

As shown in FIG. 6, process 600 may include receiving client equipment information for a set of client equipment associated with an organization (block 610). For example, the equipment management platform (e.g., equipment management platform 240, using processor 320, memory 330, input component 350, communication interface 370, etc.) may receive client equipment information for a set of client equipment (e.g., a set of client equipment 210) associated with an organization. In some implementations, the client equipment information for each client equipment, of the set of client equipment, may include information identifying an equipment state.

As shown in FIG. 6, process 600 may include receiving information describing a set of equipment management services being offered by one or more vendor organizations (block 620). For example, the equipment management platform (e.g., equipment management platform 240, using processor 320, memory 330, input component 350, communication interface 370, etc.) may receive information describing a set of equipment management services being offered by one or more vendor organizations. In some implementations, the set of equipment management services may be offered based on the client equipment information.

As shown in FIG. 6, process 600 may include identifying, based on the client equipment information, a subset of the set of equipment management services to offer an individual associated with the organization (block 630). For example, the equipment management platform (e.g., equipment management platform 240, using computing resource 245, processor 320, etc.) may identify, based on the client equipment information, a subset of the set of equipment management services to offer an individual associated with the organization. In some implementations, the subset may be identified by using a model to process at least one of the client equipment information, the information describing the set of equipment management services, or shopper preferences information for the individual.

As shown in FIG. 6, process 600 may include providing, for display via an interface of a program, information describing the subset of the set of equipment management services (block 640). For example, the equipment management platform (e.g., equipment management platform 240, using processor 320, output component 360, communication interface 370, etc.) may provide, for display via an interface of a program, information describing the subset of the set of equipment management services.

As shown in FIG. 6, process 600 may include receiving, from a client device that is accessing the interface, information identifying a selection of a particular equipment management service, of the subset of the set of equipment management services, for particular client equipment of the set of client equipment (block 650). For example, the equipment management platform (e.g., equipment management platform 240, using processor 320, memory 330, input component 350, communication interface 370, etc.) may receive, from a client device that is accessing the interface, information identifying a selection of a particular equipment management service, of the subset of the set of equipment management services, for particular client equipment of the set of client equipment.

As shown in FIG. 6, process 600 may include performing one or more actions associated with assisting in performance or delivery of the particular equipment management service that has been selected (block 660). For example, the equipment management platform (e.g., equipment management platform 240, using processor 320, output component 360, communication interface 370, etc.) may perform one or more actions associated with assisting in performance or delivery of the particular equipment management service that has been selected.

Process 600 may include additional aspects, such as any single aspect or any combination of aspects described below and/or in connection with one or more other processes described elsewhere herein.

In some implementations, the equipment management platform may predict, after receiving the information describing the set of equipment management services, a set of shopping parameters for the individual using a machine learning model. In this case, the equipment management platform may use the information indicating the set of shopping parameters as the shopper preferences information for the individual.

In some implementations, the equipment management platform may receive the client equipment information from a server (e.g., IoT platform 230) that collects the client equipment information from the set of client equipment or from one or more internet of things (IoT) devices (e.g., one or more IoT devices 220) that monitor the set of client equipment. In some implementations, the set of client equipment or the one or more IoT devices may be able to monitor an element state of one or more elements of each client equipment of the set of client equipment.

In some implementations, the equipment management platform may search, after receiving the client equipment information, a data structure that associates client equipment identifiers for the set of client equipment with vendor identifiers of vendor organizations capable of providing particular equipment management services for each client equipment of the set of client equipment. In some implementations, the equipment management platform may identify one or more vendor identifiers for the one or more vendor organizations that are offering the set of equipment management services based on searching the data structure. In some implementations, the equipment management platform may provide the client equipment information to one or more devices associated with the one or more vendor organizations to permit the one or more devices to generate the information describing the set of equipment management services.

In some implementations, the equipment management platform may sort the subset of the set of equipment management services that have been identified based on a degree to which the individual is predicted to select each of the one or more equipment management services. Additionally, the equipment management platform may provide, for display via the interface, the information describing the subset of the set of equipment management services in an order determined from the sorting.

In some implementations, the equipment management platform may provide, for display via the interface and as part of the information describing the subset of the set of equipment management services, information describing one or more promotional offers that are based on the equipment state of the set of client equipment. In some implementations, the equipment management platform may generate a work order instructing an employee or a machine to repair or replace the particular client equipment. In some implementations, the employee and the machine may be associated with the vendor organization that is offering the particular equipment management service. In some implementations, the work order may be generated based on analyzing scheduling information associated with the vendor organization, and scheduling information associated with a particular site of the organization in which the particular client equipment is located. In some implementations, the equipment management platform may provide the work order to an account associated with the employee or to the machine to schedule performance of the particular equipment management service.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

In this way, the equipment management platform is able to provide the organization with offers for equipment management services that are based on the client equipment information of the set of client equipment and/or that are based on shopper preferences of employees of the organization. This allows the equipment management platform to conserve processing resources and/or network resources that might otherwise be used to provide the client device with offers of equipment management services that are not relevant to the particular client equipment that needs to be serviced, offers of equipment management services that do not comply with shopper preferences of the individual, and/or the like. Furthermore, in some cases, the equipment management platform may provide the organization with predictions as to when client equipment is likely to malfunction. This conserves processing resources and/or network resources of one or more devices of the organization that would otherwise be used to manage client equipment that malfunctions or fails.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more memories; and
   one or more processors, communicatively connected to the one or more memories, to:
      receive client equipment information for a set of client equipment associated with an organization,
         wherein the client equipment information includes information identifying an equipment state;
      transmit the client equipment information to a machine learning model,
         the client equipment information to be provided as input to the machine learning model, and
         the machine learning model to output one or more values associated with a likelihood that client equipment, of the set of client equipment, will malfunction within a particular period of time;
      receive information describing a set of equipment management services that are being offered by one or more vendor organizations,
         wherein the set of equipment management services are offered based on the one or more values associated with the likelihood that the client equipment will malfunction within the particular period of time;
      receive, from a client device that is accessing an interface of a program, a request for a list of prospective equipment management services associated with particular client equipment of the set of client equipment,
         wherein the program is used to allow the one or more vendor organizations to offer the set of equipment management services to the organization;
      identify one or more equipment management services, of the set of equipment management services, for the list of prospective equipment management services, by using a model to process:
         the client equipment information for the particular client equipment,
         the information describing the set of equipment management services, and
         shopper preferences information for an individual that is using the client device to access the program;
      provide information describing the one or more equipment management services for display on another interface of the program,
         wherein the information includes information describing one or more promotional offers that are based on the equipment state of the particular client equipment;
      receive, from the client device that is accessing the other interface, information identifying a selection of a particular equipment management service of the one or more equipment management services; and
      perform one or more actions based on receiving information identifying the selection of the particular equipment management service,
         wherein the one or more actions include at least one of:
            causing an automated service to be performed with respect to repairing a software element associated with the particular client equipment, or
            causing a drone to automatically deliver a part to a particular client site.

2. The device of claim 1, wherein the information identifying the equipment state of the particular client equipment includes:
   information identifying a first state associated with equipment failure that is capable of affecting other client equipment,
   information identifying a second state associated with equipment failure that is unable to affect the other client equipment, or
   information identifying a third state associated with a prediction of equipment failure.

3. The device of claim 1, wherein the one or more processors are further to:
   sort the set of equipment management services that have been received based on a degree of severity of the equipment state; and
   provide the set of equipment management services that have been sorted for display on the interface.

4. The device of claim 1, wherein the interface is a first interface;
   wherein the other interface is a second interface; and
   wherein the one or more processors are further to:
      generate, after receiving the information describing the set of equipment management services, a set of shopping parameters that are to be displayed via a third interface of the program; and
      receive, from the client device, information indicating one or more shopping parameters that have been selected from the set of shopping parameters, wherein the information indicating the one or more shopping parameters is to be used by the model as the shopper preferences information for the individual.

5. The device of claim 1, wherein the client equipment information for the particular client equipment includes location information; and
wherein the one or more processors, are further to:
identify, after receiving the client equipment information, vendor organizations that are within a threshold distance of the particular client equipment;
provide the client equipment information for the particular client equipment to one or more devices associated with the vendor organizations that are within the threshold distance of the particular client equipment; and
wherein the one or more processors, when receiving the information describing the set of equipment management services, are to:
receive the information describing the set of equipment management services from the one or more devices associated with the vendor organizations.

6. The device of claim 1, wherein the one or more processors are further to:
automatically schedule performance or delivery of the particular equipment management service that has been selected.

7. A non-transitory computer-readable medium storing instructions, the instructions comprising:
one or more instructions that, when executed by one or more processors, cause the one or more processors to:
provide, for display via a first interface, of a set of interfaces of a program, client equipment information for a set of client equipment associated with an organization,
wherein the client equipment information for each client equipment, of the set of client equipment, includes information identifying an equipment state, and
wherein the first interface is provided based on receiving the client equipment information;
transmit the client equipment information to a machine learning model,
the client equipment information to be provided as input to the machine learning model, and
the machine learning model to output one or more values associated with a likelihood that client equipment, of the set of client equipment, will malfunction within a particular period of time;
receive information describing a set of equipment management services that are being offered by one or more vendor organizations,
wherein the set of equipment management services being offered are based on the one or more values associated with the likelihood that the client equipment will malfunction within the particular period of time;
receive, from a client device that is accessing the first interface of the program, a request for a list of prospective equipment management services associated with particular client equipment of the set of client equipment;
identify one or more equipment management services, of the set of equipment management services, for the list of prospective equipment management services, by using a model to process:
the client equipment information for the particular client equipment,
the information describing the set of equipment management services, and
shopper preferences information for an individual that is using the client device to access the program;
provide, for display via a second interface, of the set of interfaces of the program, the information describing the one or more equipment management services,
wherein the information includes information describing one or more promotional offers that are based on the equipment state of the particular client equipment;
receive, from the client device that is accessing the second interface, information identifying a selection of a particular equipment management service of the one or more equipment management services; and
perform one or more actions based on receiving the information identifying the selection of the particular equipment management service,
wherein the one or more actions include at least one of:
causing an automated service to be performed with respect to repairing a software element associated with the particular client equipment, or
causing a drone to automatically deliver a part to a particular client site.

8. The non-transitory computer-readable medium of claim 7, wherein the client equipment information for a group of client equipment of the set of client equipment include information identifying one or more component states of components of the group of client equipment; and
wherein the one or more instructions, when executed by the one or more processors, further cause the one or more processors to:
provide the client equipment information for the group of client equipment to one or more devices associated with particular vendor organizations, of the one or more vendor organizations, that offer component management services for the group of client equipment; and
wherein the one or more instructions, that cause the one or more processors to receive the information describing the set of equipment management services, cause the one or more processors to:
receive information describing the component management services from the one or more devices associated with the particular vendor organizations.

9. The non-transitory computer-readable medium of claim 7, wherein the one or more instructions, when executed by the one or more processors, further cause the one or more processors to:
analyze the information describing the set of equipment management services to generate a set of shopping parameters;
provide, for display via a third interface, of the set of interfaces of the program, the set of shopping parameters;
receive, from the client device that is accessing the third interface, information indicating a selection of one or more shopping parameters of the set of shopping parameters; and
wherein the one or more instructions, that cause the one or more processors to identify the one or more equipment management services, cause the one or more processors to:

use the one or more shopping parameters as the shopper preferences information for the individual.

10. The non-transitory computer-readable medium of claim 7, wherein the one or more instructions, that cause the one or more processors to generate the set of interfaces for the program, cause the one or more processors to:
generate the first interface to display the client equipment information based on a degree of severity of the equipment state,
wherein a set of colors are provided as part of the first interface to illustrate the degree of severity of the equipment state.

11. The non-transitory computer-readable medium of claim 7, wherein the one or more instructions, when executed by the one or more processors, further cause the one or more processors to:
generate a work order that includes instructions for performing the particular equipment management service; and
provide the work order to a particular device associated with a vendor organization, of the one or more vendor organizations, that is offering the particular equipment management service.

12. A method, comprising:
receiving, by a device, client equipment information for a set of client equipment associated with an organization,
wherein the client equipment information for each client equipment, of the set of client equipment, includes information identifying an equipment state;
receiving, by the device, information describing a set of equipment management services being offered by one or more vendor organizations,
wherein the set of equipment management services offered are based on the client equipment information;
identifying, by the device and based on the client equipment information, a subset of the set of equipment management services to offer an individual associated with the organization,
wherein the subset is identified by using a model to process at least one of:
the client equipment information,
the information describing the set of equipment management services, or
shopper preferences information for the individual;
sorting, by the device, the subset of the set of equipment management services that have been identified based on a degree to which the individual is predicted to select each of the subset of the set of equipment management services;
providing, by the device and for display via an interface of a program, information describing the subset of the set of equipment management services in an order determined from the sorting;
receiving, by the device and from a client device that is accessing the interface, information identifying a selection of a particular equipment management service, of the subset of the set of equipment management services, for particular client equipment of the set of client equipment; and
performing, by the device, one or more actions associated with assisting in performance or delivery of the particular equipment management service that has been selected,
wherein performing the one or more actions comprises:
causing a vendor server associated with the particular equipment management service to one of:
cause an automated service to be performed with repairing a software element associated with a particular device associated with a vendor organization that is offering the particular equipment management service, or
cause a drone to automatically deliver a part to a particular client site.

13. The method of claim 12, further comprising:
predicting, after receiving the information describing the set of equipment management services, a set of shopping parameters for the individual using a machine learning model; and
wherein identifying the subset of the set of equipment management services comprises:
using information indicating the set of shopping parameters as the shopper preferences information for the individual.

14. The method of claim 12, wherein receiving the client equipment information comprises:
receiving the client equipment information from a server that collects the client equipment information from the set of client equipment or from one or more internet of things (IoT) devices that monitor the set of client equipment,
wherein the set of client equipment or the one or more IoT devices are able to monitor an element state of one or more elements of each client equipment of the set of client equipment.

15. The method of claim 12, further comprising:
searching, after receiving the client equipment information, a data structure that associates client equipment identifiers for the set of client equipment with vendor identifiers of vendor organizations capable of providing particular equipment management services for each client equipment of the set of client equipment;
identifying one or more vendor identifiers for the one or more vendor organizations that are offering the set of equipment management services based on searching the data structure; and
providing the client equipment information to one or more devices associated with the one or more vendor organizations to permit the one or more devices to generate the information describing the set of equipment management services.

16. The method of claim 12, wherein providing the interface comprises:
providing, for display via the interface and as part of the information describing the subset of the set of equipment management services, information describing one or more promotional offers that are based on the equipment state of the set of client equipment.

17. The method of claim 12, wherein performing the one or more actions comprises:
generating a work order instructing an employee or a machine to repair or replace the particular client equipment,
wherein the employee and the machine are associated with a vendor organization, of the one or more vendor organizations, that is offering the particular equipment management service, and
wherein the work order is generated based on analyzing:
scheduling information associated with the vendor organization, and
scheduling information associated with a particular site of the organization in which the particular client equipment is located, and providing the work order to an account associated with the employee or to the machine to schedule performance of the particular equipment management service.

18. The device of claim 6, wherein the one or more processors are to:
   determine that one or more conditions associated with a particular client equipment meet a threshold; and
   notify the one or more vendor organizations about the particular client equipment based on the one or more conditions meeting the threshold.

19. The non-transitory computer-readable medium of claim 7, wherein the one or more instructions, when executed by the one or more processors, further cause the one or more processors to:
   determine that one or more conditions associated with a particular client equipment meet a threshold; and
   notify the one or more vendor organizations about the particular client equipment based on the one or more conditions meeting the threshold.

20. The method of claim 12, comprising:
   determining that one or more conditions associated with the particular client equipment meet a threshold; and
   notifying the one or more vendor organizations about the particular client equipment based on the one or more conditions meeting the threshold.

* * * * *